(12) United States Patent
Tsuruoka

(10) Patent No.: US 7,847,841 B2
(45) Date of Patent: Dec. 7, 2010

(54) IMAGE PICKUP SYSTEM FOR REDUCING NOISE ATTRIBUTABLE TO AN IMAGE PICKUP DEVICE

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 190 days.

(21) Appl. No.: 12/276,760

(22) Filed: Nov. 24, 2008

(65) Prior Publication Data

US 2009/0073288 A1 Mar. 19, 2009

Related U.S. Application Data

(62) Division of application No. 10/530,085, filed as application No. PCT/JP2003/012653 on Oct. 2, 2003, now Pat. No. 7,598,989.

(30) Foreign Application Priority Data

Oct. 3, 2002 (JP) .............................. 2002-291562

(51) Int. Cl.
  *H04N 5/217* (2006.01)
(52) U.S. Cl. .................................. 348/241; 348/222.1
(58) Field of Classification Search ................. 348/188, 348/222.1, 232, 241, 242, 243, 244, 245; 382/254, 270, 271, 272, 273, 274, 275, 280, 382/281, 282
See application file for complete search history.

(56) References Cited

U.S. PATENT DOCUMENTS 5,046,121 A 9/1991 Yonekawa et al.
5,786,857 A 7/1998 Yamaguchi
5,825,846 A 10/1998 Aach et al.
6,512,791 B1 1/2003 Takayama
7,102,672 B1 9/2006 Jacobs

FOREIGN PATENT DOCUMENTS

| EP | 0 590 922 A2 | 4/1994 |
|---|---|---|
| JP | 03-252274 | 11/1991 |
| JP | 08-098060 | 4/1996 |
| JP | 11-501195 | 1/1999 |
| JP | 11-355781 | 12/1999 |
| JP | 2001-157057 | 6/2001 |
| JP | 2002-057900 | 2/2002 |
| WO | 96/37077 | 11/1996 |
| WO | 97/23993 | 7/1997 |

*Primary Examiner*—Nelson D Hernández Hernández
(74) *Attorney, Agent, or Firm*—Volpe and Koenig, P.C.

(57) ABSTRACT

An image pickup system according to the present invention includes an extracting unit for extracting a block area with a predetermined size from a signal of an image pickup device, a transforming unit for transforming the signal in the extracted block area into a signal in a frequency space, an estimating unit for estimating the amount of noises of a frequency component except for a zero-order component based on the zero-order component in the transformed signal in the frequency space, a noise reducing unit for reducing noises of the frequency component except for the zero-order component based on the estimated amount of noises, and a compressing unit for compressing the zero-order component and the frequency component except for the zero-order component from which the noises are reduced.

3 Claims, 16 Drawing Sheets

IMAGE PICKUP SYSTEM FOR REDUCING NOISE ATTRIBUTABLE TO AN IMAGE PICKUP DEVICE

CROSS REFERENCE TO RELATED APPLICATION(S)

This application is a divisional of U.S. patent application Ser. No. 10/530,085, filed Oct. 3, 2005, which is a 35 U.S.C. 371 submission of International Application No. PCT/JP2003/012653, International Filing Date of Oct. 2, 2003, which claims the priority of Japanese Published Patent Application No. 2002-291562, Publication Date of Oct. 3, 2002, which are incorporated by reference as if fully set forth.

FIELD OF INVENTION

The present invention relates to an image pickup system and a replay system for reducing random noises due to an image pickup device system with high precision in the compression/decompression using the frequency space of JPEG or MPEG.

BACKGROUND

Generally, a noise component is included in a digital signal obtained from an image pickup device and an analog circuit accompanied therewith and an A/D converter of the image pickup device and, mainly, is classified into a fixed pattern noise and a random noise.

The fixed pattern noise is substantially caused by noises from the image pickup device, typically, a defect pixel.

The random noise is generated in the image pickup device and the analog circuit with a characteristic approximate to the white noise characteristic.

Japanese Unexamined Patent Application Publication No. 2001-157057 discloses one technology for adaptively reducing the noises depending on a signal level under the control of the frequency characteristic via filtering based on an amount N of noises which is estimated for a signal level D from a function $[N=ab^{cD}]$ where reference symbols a, b, and c denote statically-given constant terms and the signal level D is a resultant value of the conversion into the concentration level.

Further, Japanese Unexamined Patent Application Publication No. 2002-57900 discloses another technology for reducing the noises without deterioration in original signals at the edge thereof by controlling an average number n of pixels for moving average which is used as a function $[n=a/(\Delta+b)]$ where reference symbol $\Delta$ denotes a differential $\Delta$ between a target pixel and an adjacent one thereof and reference symbols a and b denote statically-given constant terms and by using no moving average when the obtained differential $\Delta$ is a predetermined threshold or more. Further, the signal after the reduction of noises are recorded and stored via the compression using the frequency space of JPEG and MPEG and, in the replay operation, the compressed signals are decompressed.

Both the functions disclosed in Japanese Unexamined Patent Application Publication No. 2001-157057 and Japanese Unexamined Patent Application Publication No. 2002-57900 are defined in real space and the noises are reduced by using the functions in the real space. On the contrary, the signals are generally compressed/decompressed in the frequency space, independently of the noise reduction.

With the above-mentioned structure, the independent system processing of the noise reduction and the compression/decompression causes a problem against the low-cost structure of the image pickup system and the replay system for fast processing.

The fixedly-given constant terms in the above-mentioned functions do not correspond to the partial update of the system or the aging change, thereby causing the inflexibility. Further, the systems according to the technologies disclosed in Japanese Unexamined Patent Application Publication No. 2001-157057 and Japanese Unexamined Patent Application Publication No. 2002-57900 have a problem to enable the noise reduction only with the calculated constant terms for functions.

The present invention is devised in consideration of the above circumstances. It is one object of the present invention to provide an image pickup system and a replay system for fast obtaining a high-quality image with low costs.

Further, it is another object of the present invention to provide an image pickup system and a replay system for flexibly obtaining a high-quality image corresponding to various systems.

SUMMARY

An image pickup system according to the present invention includes an extracting unit for extracting a block area with a predetermined size from a signal of an image pickup device, a transforming unit for transforming the signal in the extracted block area into a signal in a frequency space, an estimating unit for estimating the amount of noises of a frequency component except for a zero-order component based on the zero-order component in the transformed signal in the frequency space, a noise reducing unit for reducing noises of the frequency component except for the zero-order component based on the estimated amount of noises, and a compressing unit for compressing the zero-order component and the frequency component except for the zero-order component from which the noises are reduced.

BRIEF DESCRIPTION OF THE DRAWING(S)

DETAILED DESCRIPTION OF THE PREFERRED EMBODIMENT(S)

Hereinbelow, embodiments of the present invention will be described with reference to the drawings.

Figure 1:
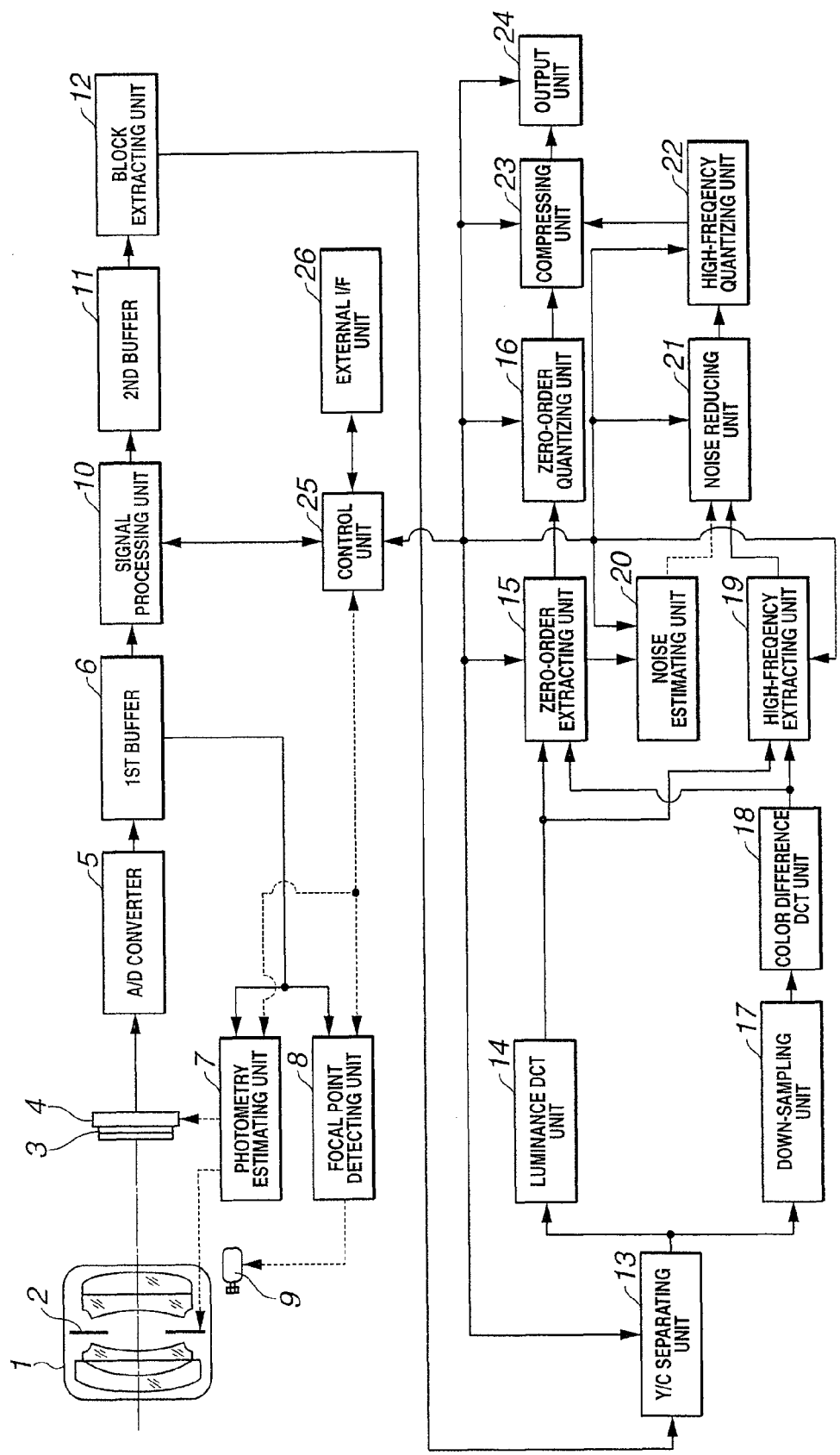
FIG. 1 is a block diagram showing the structure of an image pickup system according to a first embodiment of the present invention.
Figure 2:
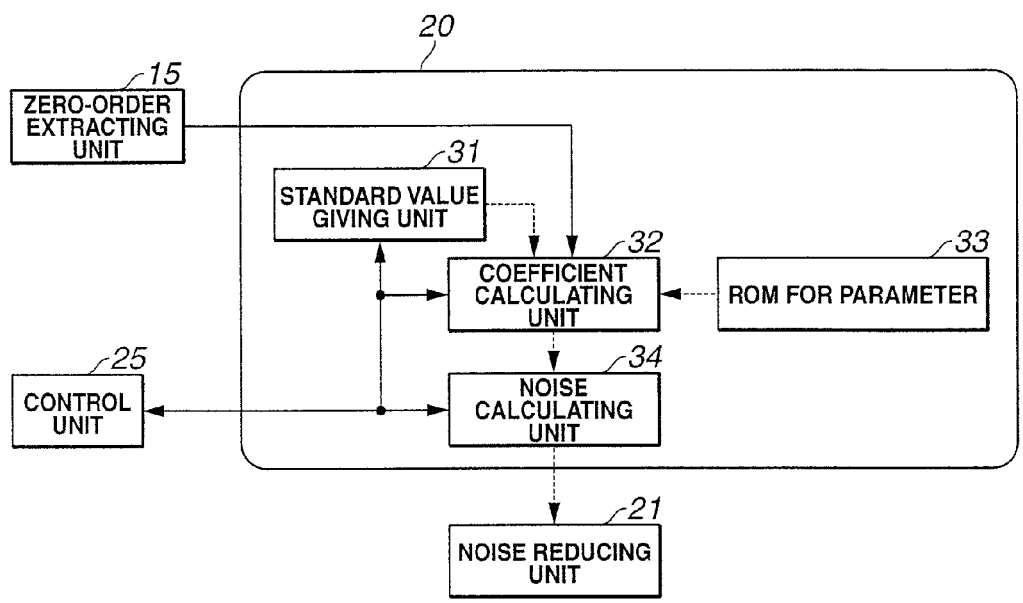
FIG. 2 is a block diagram showing the structure of a noise estimating unit according to the first embodiment.
Figure 4B:
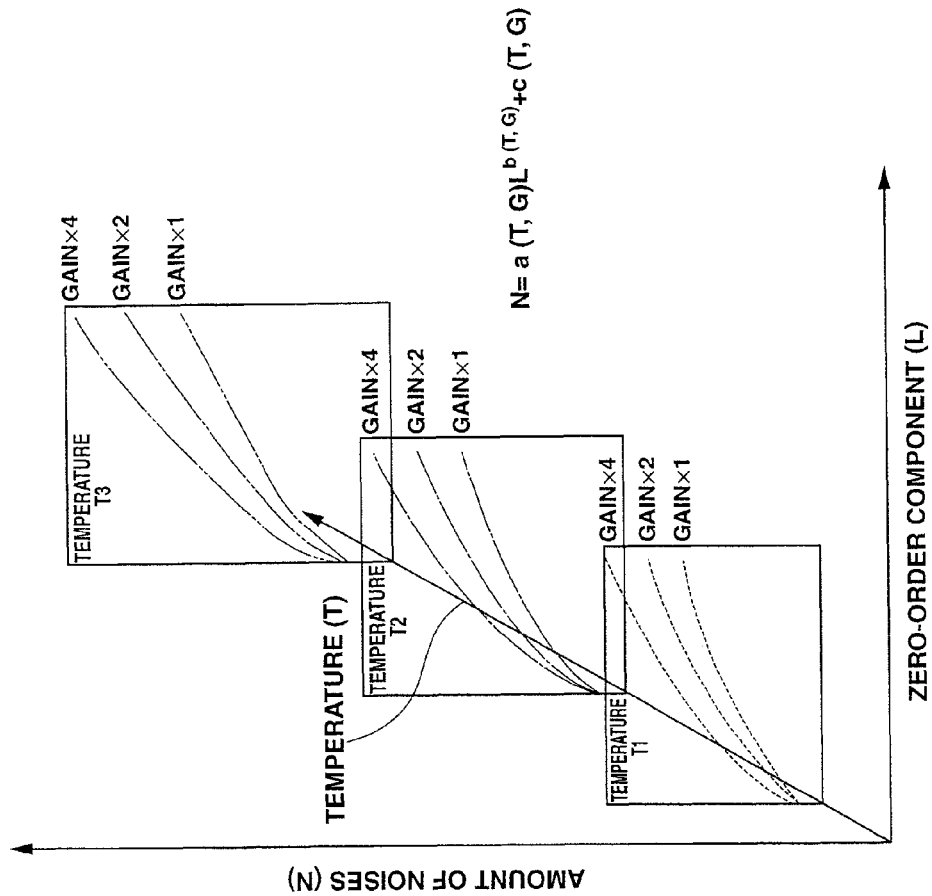
FIG. 4B is a graph for explaining another formulation of the amount of noises according to the first embodiment.
Figure 4A:
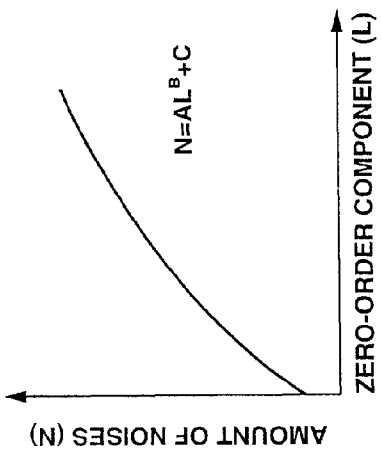
FIG. 4A is a graph for explaining one formulation of the amount of noises according to the first embodiment.
Figure 5A:
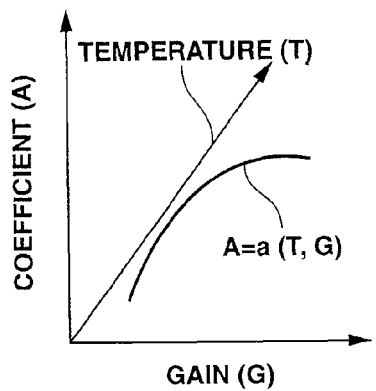
FIG. 5A is a graph for explaining one example of a parameter for formulation of the amount of noises according to the first embodiment.
Figure 5B:
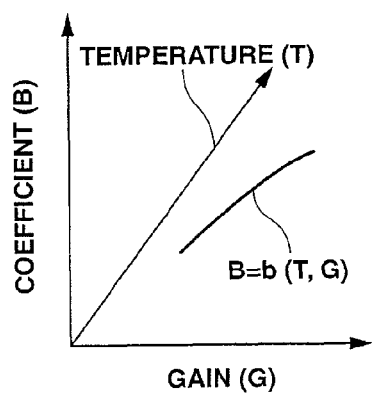
FIG. 5B is a graph for explaining another example of the parameter for formulation of the amount of noises according to the first embodiment.
Figure 5C:
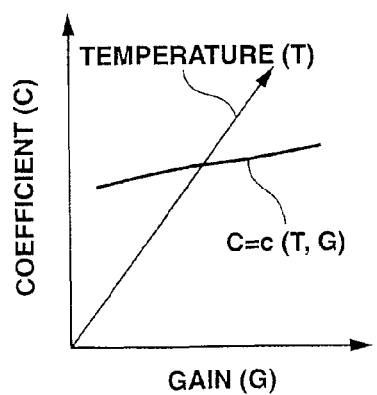
FIG. 5C is a graph for explaining another example of the parameter for formulation of the amount of noises according to the first embodiment.
Figure 6:
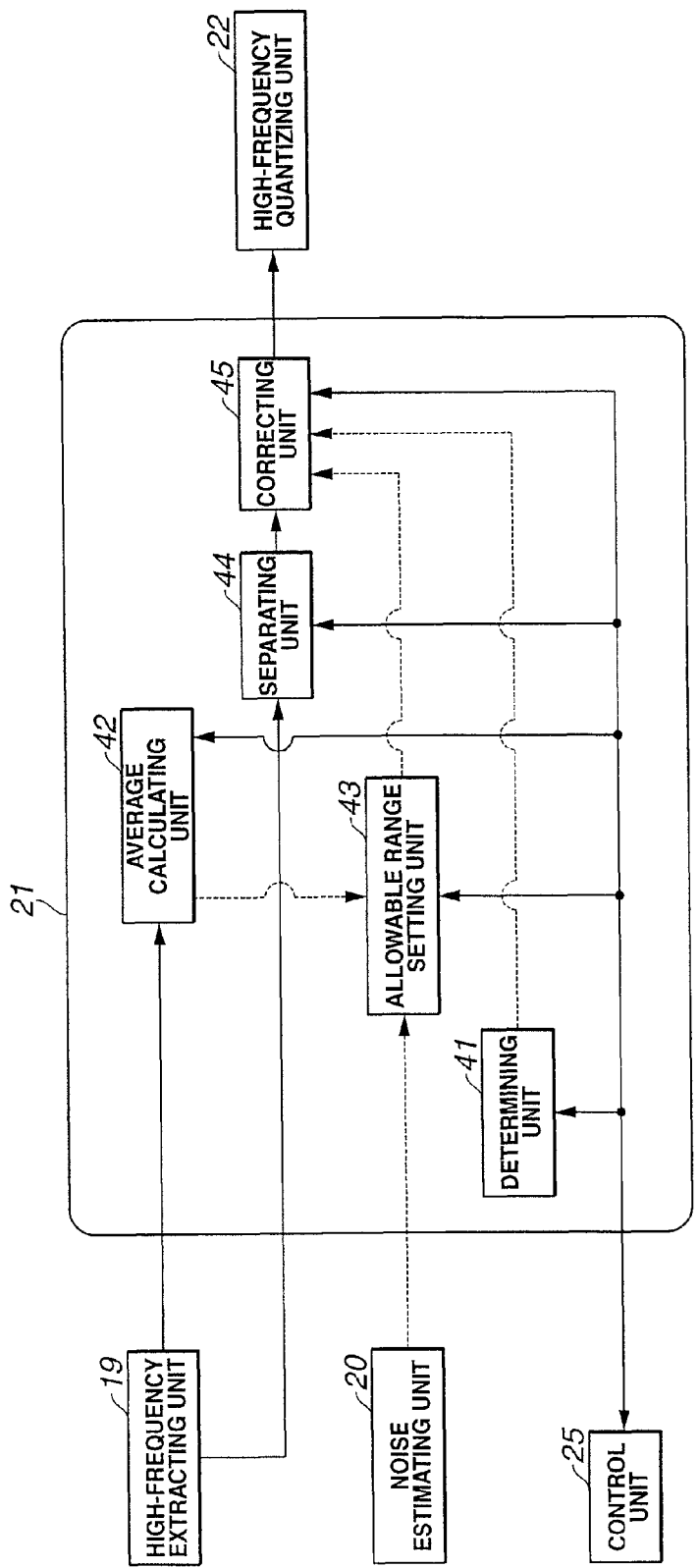
FIG. 6 is a block diagram showing the structure of a noise reducing unit according to the first embodiment.
Figure 7A:
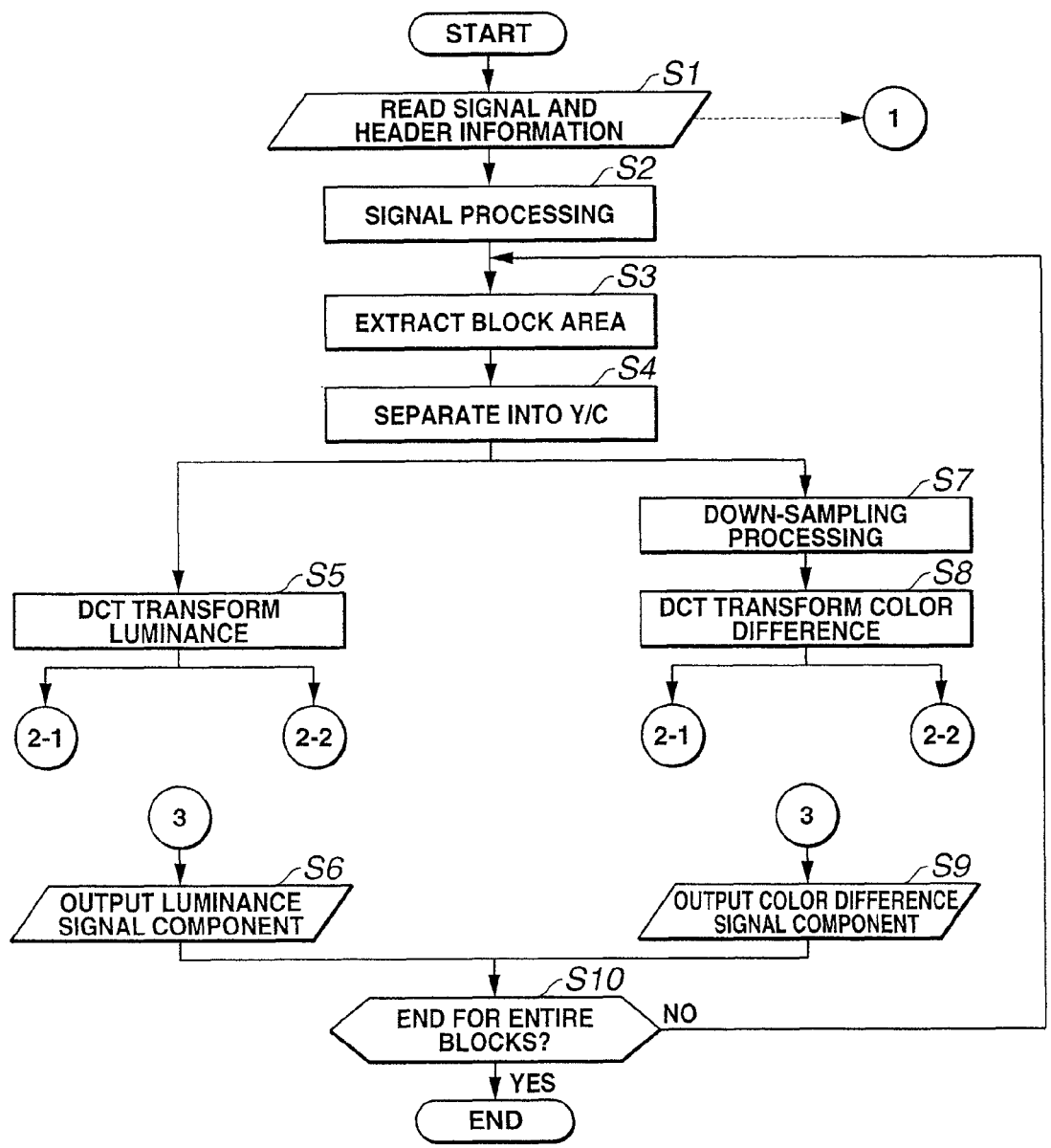
FIG. 7A is a flowchart showing one software processing of noise reduction and compression according to the first embodiment.
Figure 7B:
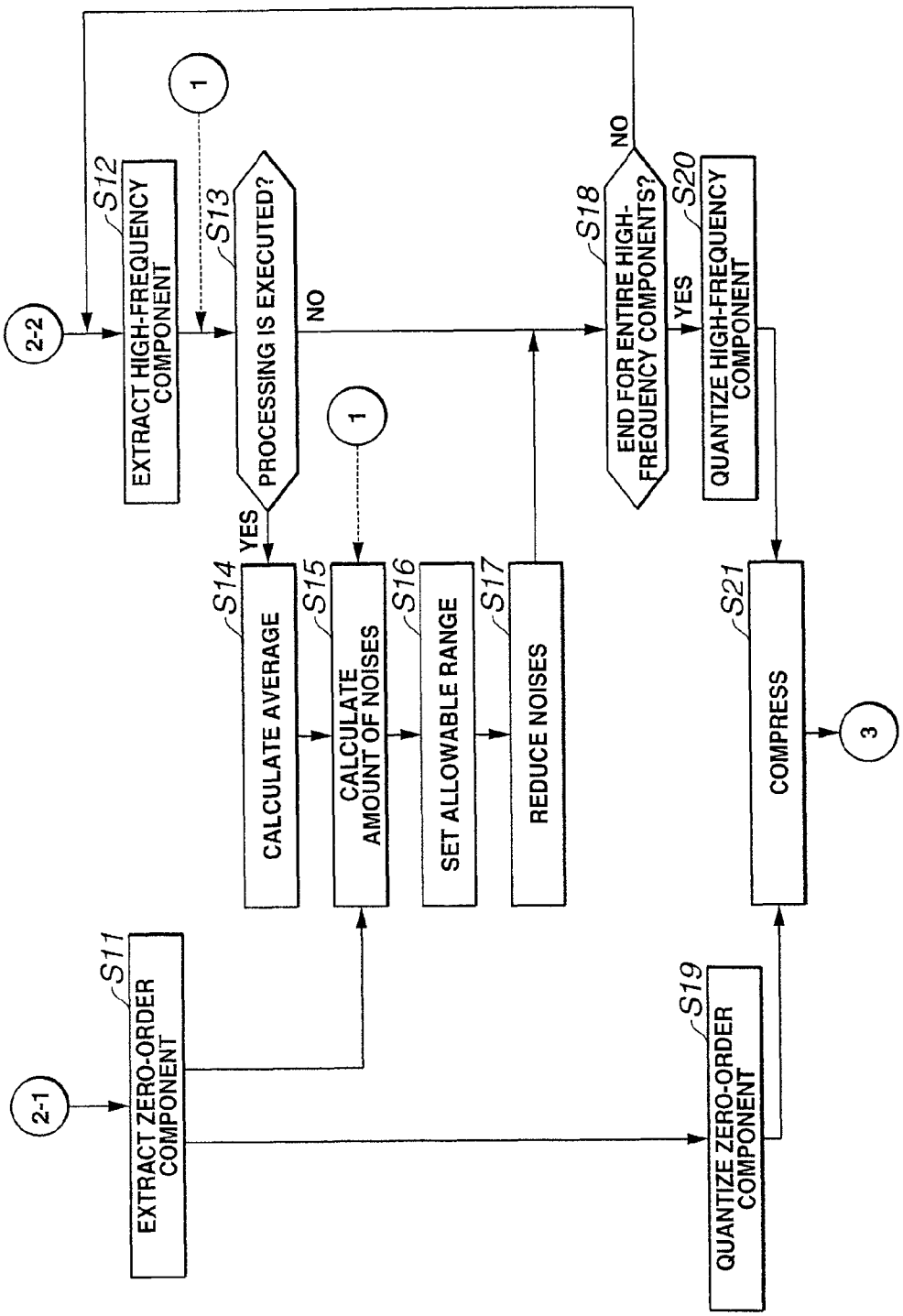
FIG. 7B is a flowchart showing another software processing of noise reduction and compression according to the first embodiment.

FIGS. 1 to 7B show the first embodiment of the present invention. FIG. 1 is a block diagram showing the structure of an image pickup system. FIG. 2 is a block diagram showing the structure of a noise estimating unit. FIGS. 3A and 3B are diagrams for explaining DCT transformations. FIGS. 4A and 4B are graphs for explaining formulations of the amount of noises. FIGS. 5A to 5C are graphs for explaining parameters for formulation of the amount of noises. FIG. 6 is a block diagram showing the structure of a noise reducing unit. FIGS. 7A and 7B are flowcharts showing software processing of noise reduction and compression.

Referring to FIG. 1, the image pickup system comprises: a lens system 1 for forming an image of a subject; a stop 2 arranged in the lens system 1, for prescribing the transmission range of beams through the lens system 1; a low-pass filter 3 for removing an unnecessary high-frequency component from the beams which form the image via the lens system 1; a CCD 4, serving as an image pickup device, for photoelectrically converting an optical subject image formed via the low-pass filter 3 and outputting an electronic video signal; an A/D converter 5 for converting, into a digital signal, an analog video signal outputted from the CCD 4; a first buffer 6 for temporarily storing the digital image data outputted from the A/D converter 5; a photometry estimating unit 7 for estimating the photometry on the subject by using image data stored in the first buffer 6 and controlling the stop 2 and the CCD 4 based on the estimating result; a focus detecting unit 8 for detecting the focal point by using the image data stored in the first buffer 6 and driving an AF motor 9, which will be described later, based on the detecting result; the AF motor 9 for driving a focus lens and the like incorporated in the lens system 1 under the control of the focus detecting unit 8; a signal processing unit 10 for reading a video signal stored in the first buffer 6 and performing general signal processing including the white balance processing, interpolation, and emphasis; a second buffer 11 for temporarily storing the video signal processed by the signal processing unit 10; a block extracting unit 12, serving as block extracting means, for sequentially reading the video signal stored in the second buffer 11 based on the unit of size of predetermined block; a Y/C separating unit 13 for separating, into a luminance signal Y and color difference signals Cb and Cr, R, G, B signals based on the unit of block read by the block extracting unit 12; a luminance DCT unit 14, serving as transforming means, for transforming the luminance signal Y separated by the Y/C separating unit 13 into a frequency spatial signal by a well-known DCT (Discrete Cosine Transform) transformation; a down-sampling unit 17 for down-sampling the color difference signals Cb and Cr separated by the Y/C separating unit 13 by a predetermined ratio; a color difference DCT unit 18, serving as transforming means, for transforming the color difference signals Cb and Cr down-sampled by the down-sampling unit 17 into the frequency spatial signal by the DCT transformation; a zero-order extracting unit 15 for extracting a zero-order component from an output of the luminance DCT unit 14 and extracting the zero-order component from the output of the color difference DCT unit 18; a zero-order quantizing unit 16 for quantizing the zero-order component extracted by the zero-order extracting unit 15; a noise estimating unit 20, serving as noise estimating means, for estimating the amount of noises of the frequency component except for the zero-order component from the zero-order components extracted by the zero-order extracting unit 15; a high-frequency extracting unit 19 for extracting the frequency component except for the zero-order component from the luminance DCT unit 14 and further extracting the frequency component except for the zero-order component from the output of the color difference DCT unit 18; a noise reducing unit 21, serving as noise reducing means, for reducing the noises with the high-frequency component extracted by the high-frequency extracting unit 19 based on the amount of noises estimated by the noise estimating unit 20; a high-frequency quantizing unit 22 for quantizing the high-frequency component processed by the noise reducing unit 21; a compressing unit 23, serving as compressing means, for compressing the output of the zero-order quantizing unit 16 and an output of the high-frequency quantizing unit 22; an output unit 24 for recording the image data compressed by the compressing unit 23 to a recording medium such as a memory card; an external I/F unit 26 having an interface to a power switch, shutter button, and a mode switch for switching various photographing modes; and a control unit 25 serving as both control means and obtaining means, having a microcomputer for systematically controlling the image pickup system including the photometry estimating unit 7, the focal point detecting unit 8, the signal processing unit 10, the Y/C separating unit 13, the zero-order extracting unit 15, the zero-order quantizing unit 16, the high-frequency extracting unit 19, the noise estimating unit 20, the noise reducing unit 21, the high-frequency quantizing unit 22, the compressing unit 23, the output unit 24, and the external I/F unit 26 connected interactively thereto.

Next, a description is given of the signal flow in the image pickup system shown in FIG. 1.

In the image pickup system, the photographing condition such the ISO sensitivity is set via the external I/F unit 26. After the photographing condition, the shutter button serving as a two-step pressing button switch is half pressed, thereby entering a pre-image-pickup mode.

The optical image formed via the lens system 1, the stop 2, and the low-pass filter 3 photographed by the CCD 4, is outputted as an analog video signal, is converted into a digital signal by the A/D converter 5, and is transferred to the first buffer 6.

According to the first embodiment, the CCD 4 is a single-plate primary color CCD having primary color R, G, and B filters in front of the image pickup surface.

Then, the video signal in the first buffer 6 is transferred to the photometry estimating unit 7 and the focal point detecting unit 8.

The photometry estimating unit 7 obtains the luminance level in the image, calculates a best exposure value in consideration of the set ISO sensitivity and shutter speed of the limit of image stabilizer, and controls the electronic shutter speed of the CCD 4 and a stop value of the stop 2 to obtain the best exposure value.

The focal point detecting unit 8 detects the edge emphasis in the image, and controls the AF motor 9 so that the edge emphasis is maximum to obtain the focused image.

Through the pre-image-pickup mode, the preparation for photographing ends. Next, the entire press of the shutter button is detected via the external I/F unit 26 and then the photographing operation is performed.

The photographing operation is performed under the exposure condition obtained by the photometry estimating unit 7 and the focusing condition obtained by the focal point detecting unit 8. The conditions in the photographing operation are transferred to the control unit 25 serving as the obtaining means.

After the photographing operation, the video signal is transferred and stored to the first buffer 6, similarly to the pre-image-pickup mode.

The video signal in the first buffer 6 is transferred to the signal processing unit 10, is subjected to the well-known white balancing processing, interpolation, and emphasis, and is transferred to the second buffer 11.

The block extracting unit 12 sequentially reads the video signal stored in the second buffer 11 with a predetermined block size, e.g., a unit block containing 8×8 pixels, under the control of the control unit 25, and transfers the read signals to the Y/C separating unit 13.

The Y/C separating unit 13 converts the video signal comprising the R, G, and B signals from the block extracting unit 12 into the luminance signal Y and the color difference signals Cb and Cr based on converting formulae as shown in the following Formula 1.

$$Y = 0.29900R + 0.58700G + 0.11400B$$

$$Cb = -0.16874R - 0.33126G + 0.50000B$$

$$Cr = 0.50000R - 0.41869G - 0.08131B \quad \text{[Formula 1]}$$

The luminance signal Y generated by the Y/C separating unit 13 is transferred to the luminance DCT unit 14, and the color difference signals Cb and Cr are transferred to the down-sampling unit 17.

The down-sampling unit 17 down-samples the color difference signals Cb and Cr by a predetermined ratio, and then transfers the sampled signals to the color difference DCT unit 18.

As mentioned above, the luminance DCT unit 14 and the color difference DCT unit 18 performs the well-known DCT (Discrete Cosine Transform) transformation, thereby transforming the video signal in the real space into the signal in the frequency space.

The signal transformed into the frequency space is subjected to the noise reduction and the compression in the order of the luminance signal Y and the color difference signals Cb and Cr based on the control of the control unit 25 as follows.

First, the zero-order extracting unit 15 extracts the zero-order component from the signal in the frequency space transformed by the luminance DCT unit 14 and the color difference DCT unit 18.

Next, the zero-order quantizing unit 16 quantizes the zero-order component extracted by the zero-order extracting unit at a predetermined interval.

The compressing unit 23 compresses the zero-order component after the quantization by the well-known Huffman coding and arithmetic coding. The above-compressed signals are sequentially transferred to the output unit 24, and are stored in the memory card as mentioned above.

The noise estimating unit 20 obtains the zero-order component from the zero-order extracting unit 15, obtains the image in the photographing operation from the control unit 25, and calculates the amount of noises of the frequency component except for the zero-order component based on the information.

The high-frequency extracting unit 19 extracts the frequency component except for the zero-order component from the signal in the frequency space transformed by the luminance DCT unit 14 and the color difference DCT unit 18.

The noise reducing unit 21 reduces the noises of the frequency component except for the zero-order component from the high-frequency extracting unit 19 based on the amount of noises from the noise estimating unit 20.

The high-frequency quantizing unit 22 quantizes the high-frequency component subjected to the noise reduction of the noise reducing unit 21 at a predetermined interval.

The compressing unit 23 compresses the high-frequency component quantized by the high-frequency quantizing unit 22 by the well-known Huffman coding or arithmetic coding, similarly to the zero-order component quantized by the zero-order quantizing unit 16. The compressed signal is sequentially transferred to the output unit 24, and is stored in the memory card as mentioned above. The compressing unit 23 performs the well-known JPEG compression.

The processing of the Y/C separating unit 13, the zero-order extracting unit 15, the zero-order quantizing unit 16, the high-frequency extracting unit 19, the noise estimating unit 20, the noise reducing unit 21, the high-frequency quantizing unit 22, and the compressing unit 23 is performed under the control of the control unit 25, synchronously with the operation for extracting the block of the block extracting unit 12 based on the unit of block.

Next, an example of the structure of the noise estimating unit 20 will be described with reference to FIG. 2.

The noise estimating unit 20 comprises: a standard value giving unit 31, serving as giving means, for transferring the standard temperature of the CCD 4 to a coefficient calculating unit 32, which will be described later; a ROM 33 for parameter, serving as coefficient calculating means, for storing a parameter of a function, which will be described later, for estimating the amount of noises; a coefficient calculating unit 32, serving as coefficient calculating means, for calculating a coefficient of a predetermined formula for estimating the amount of noises of the high-frequency component except for the zero-order component based on the parameter from the ROM 33 for parameter, the zero-order component from the zero-order extracting unit 15, the gain from the control unit 25, and the temperature information from the standard value giving unit 31; and a noise calculating unit 34, serving as noise calculating means, for calculating the amount of noises by using a formulated function, which will be described later, with the coefficient calculated by the coefficient calculating unit 32 and transferring the amount of noises to the noise reducing unit 21.

The standard value giving unit 31, the coefficient calculating unit 32, and the noise calculating unit 34 are interactively connected to the control unit 25 for control operation. The control unit 25 determines gain of the signal from the photometry estimating unit 7 or signal processing unit 10, and transfers the gain to the coefficient calculating unit 32.

Figure 3A:
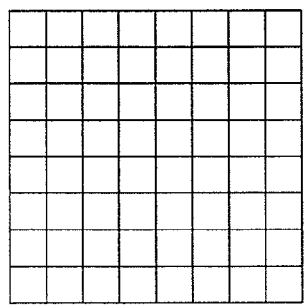
FIG. 3A is a diagram for explaining one DCT transformation according to the first embodiment.
Figure 3B:
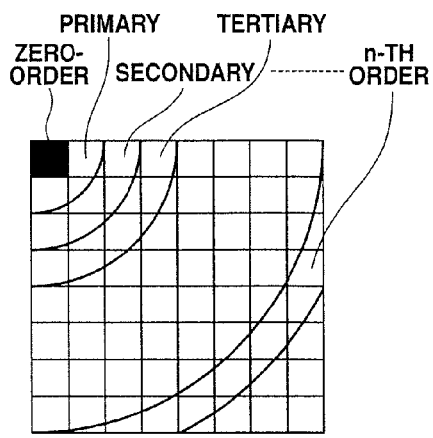
FIG. 3B is a diagram for explaining another DCT transformation according to the first embodiment.

Herein, a description is given of the order component for DCT transformation to the frequency space with reference to FIGS. 3A and 3B. FIG. 3A shows a block having 8×8 pixels in the real space. FIG. 3B shows a block having 8×8 pixels in the frequency space.

Referring to FIG. 3A, the signal in the pixel block in the real space is subjected to the DCT transformation, thereby obtaining the component of the pixel block in the frequency space shown in FIG. 3B. Referring to FIG. 3B, the frequency space has the origin on the upper left, that is, zero-order component, and the high-frequency component of primary or more on the coaxial position with the origin as the center. The zero-order extracting unit 15 performs the processing for extracting, as the zero-order component, the pixel on the upperleft in the frequency space shown in FIG. 3B.

Next, a description is given of the formulation of the amount of noises with reference to FIGS. 4A and 4B. FIG. 4A shows the plotting of an amount N of noises for a zero-order component L, serving as a formulated function shown in Formula 2.

$$N = AL^B + C \qquad \text{[Formula 2]}$$

where reference symbols A, B, and C denote constant terms. This formula 2 is obtained by adding the constant term to a function of the power of the zero-order component L.

However, the amount N of noises does not depend on only the zero-order component L of the signal value level. In addition, the amount N of noises varies depending on the temperature of the CCD 4 serving as the image pickup device and the gain of signal. Therefore, the factors are considered in the example shown in FIG. 4B.

That is, in place of the constant terms A, B, and C in Formula 2, three functions a(T, G), b(T, G), and c(T, G) using the parameters of the temperature T and the gain G are introduced in Formula 3.

$$N = a(T,G)L^{b(T,G)} + c(T,G) \qquad \text{[Formula 3]}$$

FIG. 4B shows a curve of Formula 3 plotted by using a plurality of temperatures T (T1 to T3 in the drawing) and a plurality of gains G (1, 2, and 4 times in the drawing).

Referring to FIG. 4B, an independent variable is the zero-order component L, a dependent variable is the amount N of noises, and the temperature T serving as the parameter is plotted as the coordinates in the direction orthogonal to the variables. Therefore, the amount N of noises using the zero-order component L is read on the plane of T=T1, on the plane of T=T2, and on the plane of T=T3. In this case, the change in curve due to the gain G serving as the parameter is indicated by a plurality of curves on the planes.

The curves shown by the parameters are approximate to the curve of Formula 2 as shown in FIG. 4A. Obviously, the coefficients A, B, and C obtained from the functions a, b, and c differ depending on the value of the temperature T or the gain G.

FIG. 5A schematically shows the characteristic of the function a(T, G). FIG. 5B schematically shows the characteristic of the function b(T, G). FIG. 5C schematically shows the characteristic of the function c(T, G).

The functions use two variables of independent variables of the temperature T and the gain G. FIGS. 5A to 5C show curves in the space plotted as three-dimensional coordinates. However, the change in characteristic is shown here by using the curves, in place of showing the specific curve shapes.

The temperature T and the gain G are inputted to the functions a, b, and c as the parameters, thereby outputting the constant terms A, B, and C. The specific shapes of the functions are easily obtained by measuring, in advance, the characteristics of the image pick-up system including the CCD 4.

The coefficient calculating unit 32 obtains the constant terms A, B, and C from the three functions a, b, and c recorded to the ROM 33 for parameter by using, as the input parameters, the gain G from the control unit 25 and the temperature T from the standard value giving unit 31, and transfers the obtained constant terms A, B, and C to the noise calculating unit 34.

The noise calculating unit 34 calculates the amount N of noises based on the Formula 2 by using the zero-order component L from the coefficient calculating unit 32 and the constant terms A, B, and C, and transfers the calculated amount N of noises to the noise reducing unit 21.

In the foregoing, the temperature of the CCD 4 serving as the image pickup device is fixedly given from the standard value giving unit 31. However, the present invention is not limited to this. For example, temperature information may be obtained in real time by arranging a temperature sensor near the CCD 4 and may be transferred to the control unit 25 serving as obtaining means. On the contrary, when the gain G is not dynamically obtained, a predetermined value may be given from the standard value giving unit 31.

The formulation of the amount of noises uses the function of the power shown in Formula 2. However, the present invention is not limited to this. The formulation is possible by using a quadratic formula of $[N = AL^2 + BL + C]$. Further, a polynomial or sprine function may be used.

Next, a description is given of one example of the structure of the noise reducing unit 21 with reference to FIG. 6.

The noise reducing unit 21 comprises: a determining unit 41, serving as selecting means, for estimating a threshold n of the high-frequency component in which the information is not stored, based on information on an image quality mode (including information of a compressing ratio) from the control unit 25; an average calculating unit 42, serving as average calculating means, for calculating an average AV of the frequency component except for the zero-order component transferred from the high-frequency extracting unit 19; an allowable range setting unit 43, serving as allowable range setting means, for setting an upper limit Tup and a lower limit Tlow of the high-frequency component, which will be described later, by using the average AV from the average calculating unit 42 and the amount N of noises from the noise estimating unit 20; a separating unit 44, serving as frequency separating means, for extracting the high-frequency component within a predetermined frequency band from the frequency components except for the zero-order component transferred from the high-frequency extracting unit 19; and a correcting unit 45, serving as correcting means, for reducing the noises of the frequency components within the frequency and extracted by the separating unit 44 based on the upper limit Tup and the lower limit Tlow from the allowable range setting unit 43 and the threshold n from the determining unit 41 and transferring the processed frequency to the high-frequency quantizing unit 22. The determining unit 41, the average calculating unit 42, the allowable range setting unit 43, the separating unit 44, and the correcting unit 45 are interactively connected to the control unit 25 for control operation.

The separating unit 44 extracts the high-frequency component within the predetermined frequency band based on the control unit 25, as mentioned above, and transfers the extracted component to the correcting unit 45. In the DCT transformation, referring to FIG. 3B, the high-frequency component within the predetermined frequency band is arranged coaxially with the origin at the upper left. Therefore, the separating unit 44 sequentially extracts the high-frequency component of primary or more based on the arrangement.

The allowable range setting unit 43 sets, based on the following Formula 4, the upper limit Tup and lower limit Tlow for the high-frequency component based on the amount N of noises from the noise estimating unit 20 and the average AV from the average calculating unit 42, and transfers the set values to the correcting unit 45.

$$Tup=AV+N/2$$

$$Tlow=AV-N/2 \quad \text{[Formula 4]}$$

The determining unit 41 obtains, from the control unit 25, the information on the image quality mode set by the external I/F unit 26, and further obtains the corresponding compressing ratio from the image quality mode. The determining unit 41 estimates the threshold n of the high-frequency component which does not store the information, namely, the high-frequency component which does not store the noise component, and transfers the threshold n to the correcting unit 45.

The correcting unit 45 performs the processing of the frequency components from the separating unit 44 based on the threshold n from the determining unit 41 and the upper limit Tup and the lower limit Tlow from the allowable range setting unit 43. First, the correcting unit 45 processes only the frequency component with the order lower than the n-th order serving as the target of noise reduction based on the threshold n from the determining unit 41. And the correcting unit 45 outputs, to the high-frequency quantizing unit 22, the frequency component with the order higher than the n-th order without any processing. When the frequency component is the n-th order component or less, the correcting unit 45 selects, for an element S of the frequency component, any of three processing shown in the following Formula 5 based on the upper limit Tup and the lower limit Tlow, and corrects an element S.

$$S=S-N/2(Tup<S)$$

$$S=AV(Tlow \leq S \leq Tup)$$

$$S=S+N/2(S<Tlow) \quad \text{[Formula 5]}$$

The correcting unit 45 sequentially outputs, to the high-frequency quantizing unit 22, the element of the frequency component subjected to the correction of Formula 5.

In the foregoing, the processing is performed in the hardware manner. However, the present invention is not limited to this and the processing may be performed in the software manner. For example, the signal from the CCD 4 is set as Raw data without any processing, and the temperature in the photographing operation and the gain from the control unit 25 are added as header information to the Raw data. The Raw data with the header information may be processed on another software.

A description is given of the software processing of noise reduction and compression with reference to FIGS. 7A and 7B. FIGS. 7A and 7B show divided software processing.

Starting the processing, the video signal obtained as the Raw data and the header information serving as the temperature and the gain are read to the computer (in step S1). The header information is used in processing in steps S13 and S15, which will be described later.

Next, the read Raw data is subjected to general signal processing of white balance processing, interpolation, and emphasis (in step S2). A block area with a predetermined size, e.g., a block area with 8×8 pixels unit is extracted from the signal after processing (in step S3).

The video signals (R, G, and B signals) of the pixel in the block are converted into the luminance signal Y and the color difference signals Cb and Cr (in step S4).

Next, the luminance signal Y is transformed into the signal in the frequency space by the DCT transformation (in step S5). Then, referring to FIG. 7B, the processing advances to steps S11 and S12. The processing shown in FIG. 7B will be described later.

At the timing until the processing in step S21 shown in FIG. 7B, the processing shifts to that shown in FIG. 7A, and the luminance signal Y subjected to the compression and noise reduction is outputted (in step S6).

The color difference signals Cb and Cr separated in step S4 are down-sampled by a predetermined ratio (in step S7), and the signals are transformed into the signals in the frequency space by the DCT transformation (in step S8). Then, the processing shifts to steps S11 and S12 (refer to FIG. 7B).

At the timing of the processing in step S21 shown in FIG. 7B, the processing shifts to that shown in FIG. 7A again and the color difference signals Cb and Cr subjected to the compression and noise reduction are outputted (in step S9).

After ending the processing in steps S6 and S9, it is determined whether or not the processing ends for the entire blocks (in step S10). If the processing does not end, the processing returns to step S3 whereupon the above-mentioned operation is repeated. If it is determined in step S10 that the processing ends for the entire blocks, the processing ends.

Next, a description is given of the compression and noise reduction shown in FIG. 7B. The processing is commonly performed for the luminance signal Y and the color difference signals Cb and Cr.

The zero-order component is extracted from the component transformed in the frequency space through the processing in step S5 or S8 (step S11). The high-frequency component except for the zero-order component is extracted (step S12).

Next, it is determined whether or not the noise is reduced based on the header information read in step S1 (step S13).

If it is determined that the noise is reduced, the average of the high-frequency component is calculated (in step S14).

The amount of noises is calculated based on Formula 2 by using the zero-order component extracted in step S11 and the header information read in step S1 (in step S15).

Then, the allowable range is set based on Formula 4 (step S16). The noise is reduced based on Formula 5 (in step S17).

Upon ending the processing in step S17, or when it is determined in step S13 that the noise is not reduced, it is determined whether or not the processing ends for the entire high-frequency components (in step S18). If it is determined that the processing does not end for the entire high-frequency components, the processing returns to step S12 whereupon the next high-frequency is subjected to the above-mentioned processing.

When it is determined that the processing ends for the entire high-frequency components, the high-frequency component is quantized (in step S20).

The zero-order component extracted in step S11 is quantized (in step S19).

After ending the quantizing processing in steps S19 and S20, the quantized zero-order component and the high-frequency component are compressed (in step S21). Then, the processing shifts to that shown in FIG. 7A.

In the foregoing, the primary color single-plate CCD is used as one example. However, the present invention is not limited to this and may be a complementary-color single-plate CCD. Further, a two-plate CCD or three-plate CCD may be used.

According to the first embodiment, the compression and the noise reduction using the frequency space are integrated, thereby structuring an image pickup system with a high image quality and low costs.

Various parameters including the zero-order component on the amount of noises and the temperature and gain of the image pickup device in the photographing operation are dynamically obtained every photographing operation, and the amount of noises is calculated based on the parameters. Therefore, the amount of noises is estimated with high precision. Then, the amount of necessary memories is small by using the function upon calculating the amount of noises, and further the costs are low.

In addition, the upper limit and the lower limit are set based on the estimated amount of noises and the average of the frequency component, and the noise component is corrected. Therefore, only the noise component is removed and the signal except for the noises is stored as the original signal. Thus, the image with high quality, from which only the noises are reduced, is obtained.

Only the signal having the estimated amount of noises or less is subjected to the smoothing processing and therefore the noises are effectively reduced.

Further, when the parameters such as the temperature and the gain necessary for calculating the amount of noises are not obtained, the standard value is used and therefore the noise reduction is always executed. In addition, the parameter calculation is intentionally omitted, thereby structuring the image pickup system with low costs and low power consumption.

The signal of the frequency component is separated into the frequency bands and it is selected, depending on the compressing ratio, whether or not the noise reduction is performed every frequency band. The high-frequency component which is removed by the compression is not subjected to the noise reduction. Only the necessary frequency band is subjected to the noise reduction and therefore the processing is fast.

Figure 8:
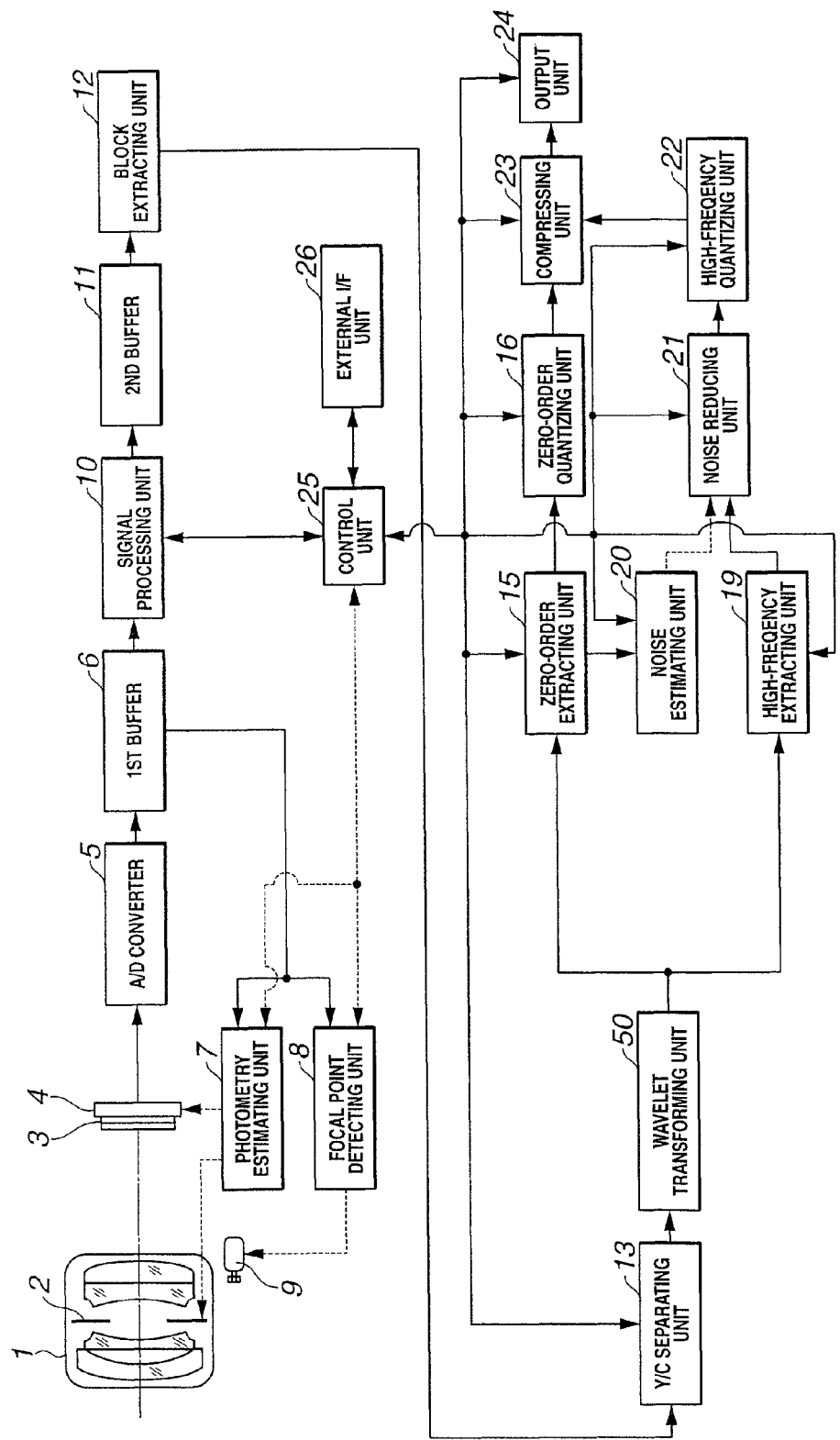
FIG. 8 is a block diagram showing the structure of an image pickup system according to a second embodiment of the present invention.
Figure 9A:
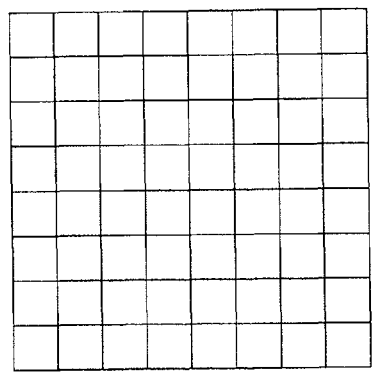
FIG. 9A is a diagram for explaining one wavelet transformation according to the second embodiment.
Figure 9B:
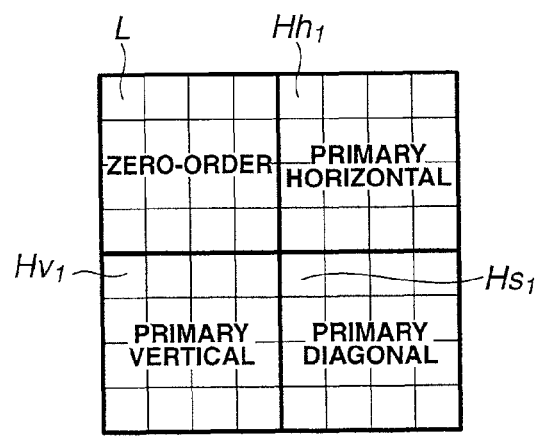
FIG. 9B is a diagram for explaining another wavelet transformation according to the second embodiment.
Figure 9C:
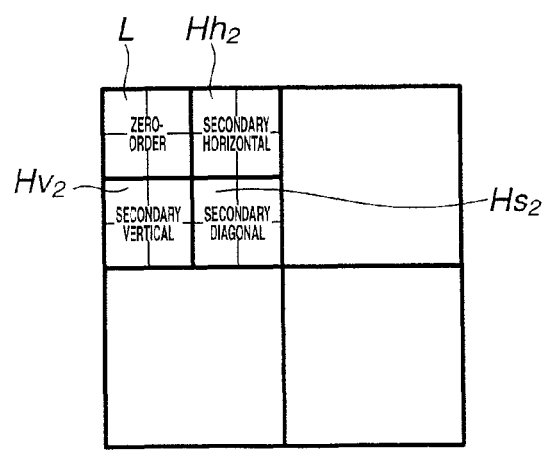
FIG. 9C is a diagram for explaining another wavelet transformation according to the second embodiment.
Figure 10:
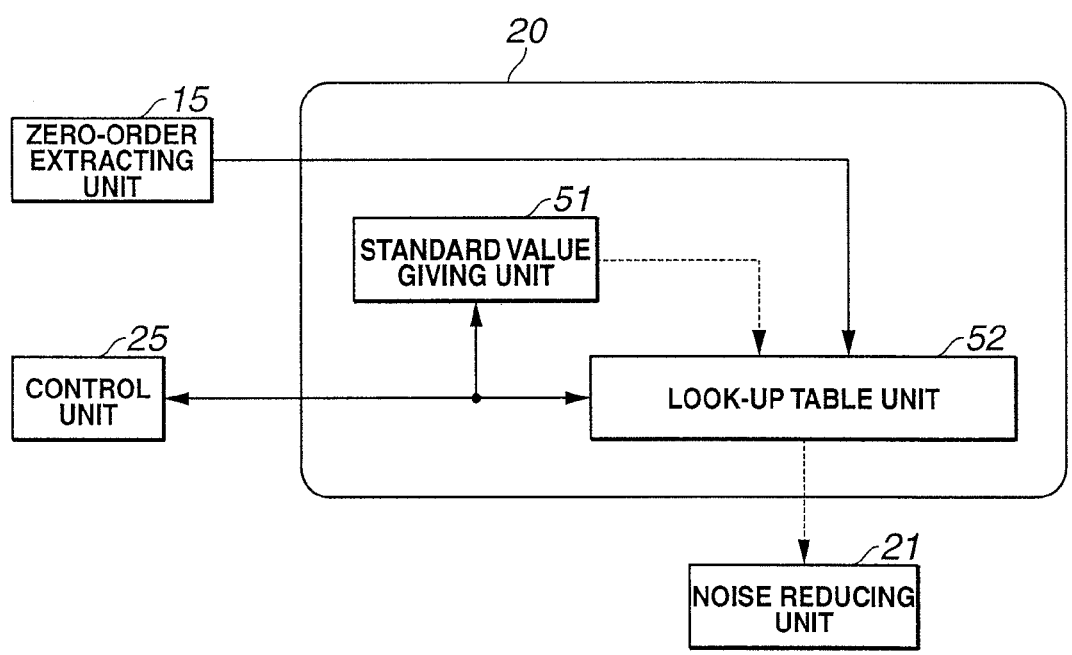
FIG. 10 is a block diagram showing the structure of a noise estimating unit according to the second embodiment.
Figure 11:
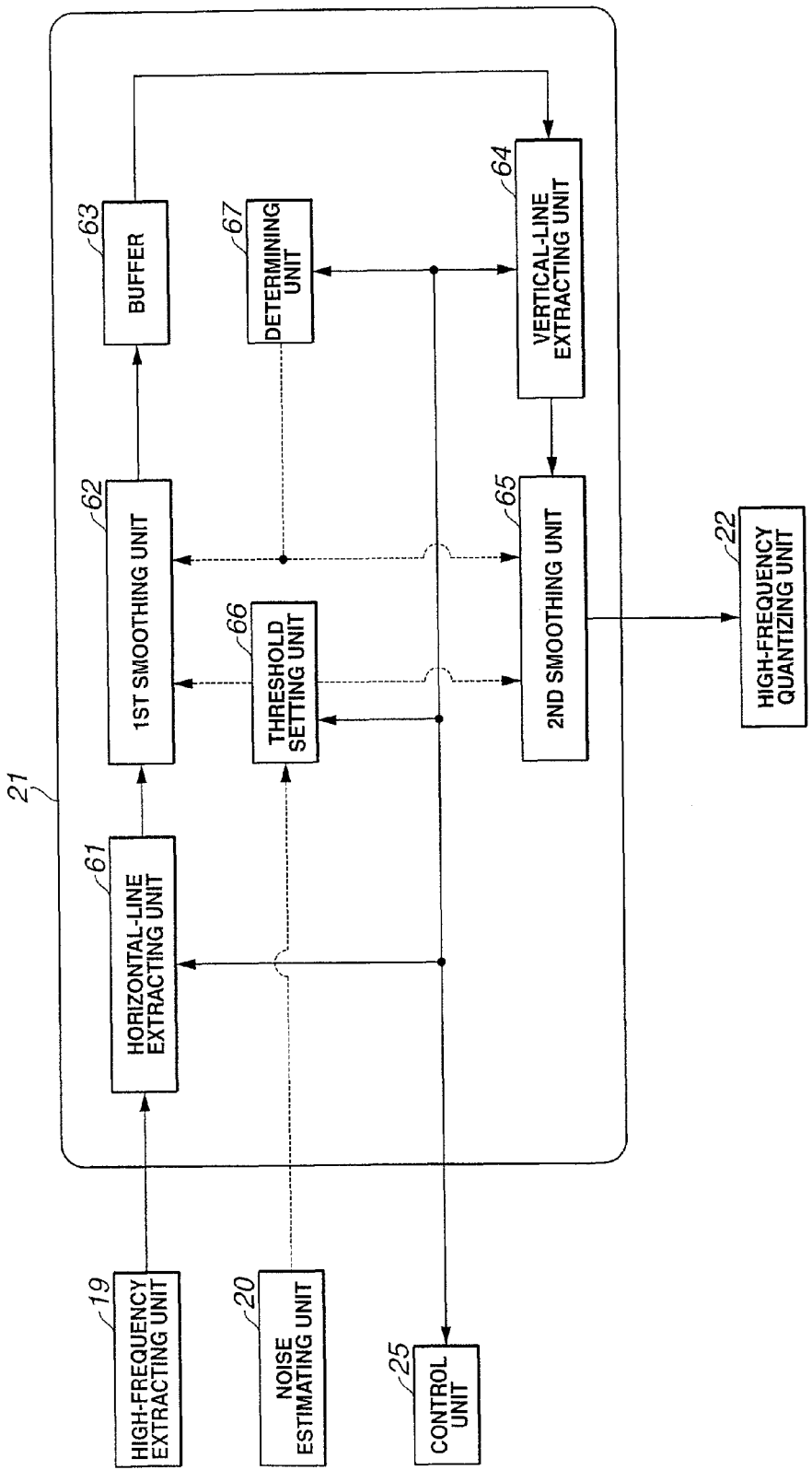
FIG. 11 is a block diagram showing the structure of a noise reducing unit according to the second embodiment.

FIGS. 8 to 11 show the second embodiment of the present invention. FIG. 8 is a block diagram showing the structure of an image pickup system. FIGS. 9A to 9C are diagrams for explaining the wavelet transformation. FIG. 10 is a block diagram showing the structure of the noise estimating unit. FIG. 11 is a block diagram showing the structure of the noise reducing unit.

According to the second embodiment, the same portions are designated by the same reference numerals according to the first embodiment, and are not described. Mainly, different points are described.

Referring to FIG. 8, the image pickup system according to the second embodiment is approximately similar to that shown in FIG. 1 according to the first embodiment and, however, additionally has a Wavelet transforming unit 50 serving as transforming means and excludes the luminance DCT unit 14, the down-sampling unit 17, and the color difference DCT unit 18. The Wavelet transforming unit 50 processes the output from the Y/C separating unit 13, and outputs the processing result to the zero-order extracting unit 15 and the high-frequency extracting unit 19.

The operation of the above-mentioned image pickup system is basically the same as that according to the first embodiment. Only different portions are described in accordance with the signal flow shown in FIG. 8.

The luminance signal Y and the color difference signals Cb and Cr obtained by the Y/C separating unit 13 are transferred to the Wavelet transforming unit 50, and are transformed into the frequency space by the Wavelet transforming unit 50.

FIGS. 9A, 9B, and 9C show the states of Wavelet transformation of the Wavelet transforming unit 50.

FIG. 9A shows the block having the 8×8 pixels in the real space.

FIG. 9B shows the block having the 8×8 pixels in the frequency space as a result of one-time Wavelet transformation of that shown in FIG. 9A. Referring to FIG. 9B, the 4×4 pixels at the upper left indicate the zero-order component L with the origin at the upper left, other 4×4 pixels indicate the primary high-frequency component, namely, the 4×4 pixels at the upper right indicate a primary horizontal component Hh1, 4×4 pixels at the lower left indicate a primary vertical component Hv1, and 4×4 pixels at the lower right indicate a primary diagonal component Hs1.

FIG. 9C shows the block having the 8×8 pixels in the frequency space as a result of two-time Wavelet transformation of that shown in FIG. 9A, that is, as a result of one-time Wavelet transformation of the zero-order component L shown in FIG. 9B. Referring to FIG. 9C, in the 4×4 pixels at the upper left, the 2×2 pixels at the upper left indicate the zero-order component L, other pixels indicate the secondary high-frequency component, namely, the 2×2 pixels at the upper right indicate a secondary horizontal component Hh2, the 2×2 pixels at the lower left indicate a secondary vertical component Hv2, and 2×2 pixels at the lower right indicate a secondary diagonal component Hs2. According to the second embodiment, as shown in FIG. 9C, a description is given of the frequency space obtained by two-time Wavelet transformation as an example.

From the signal transformed into the signal in the frequency space by the Wavelet transforming unit 50, the zero-order component is extracted by the zero-order extracting unit 15. Further, the high-frequency extracting unit 19 extracts the high-frequency component. Similarly to the first embodiment, the compression and noise reduction are performed.

Hereinbelow, a description is given of one example of the structure of the noise estimating unit 20 with reference to FIG. 10.

The noise estimating unit 20 according to the second embodiment comprises: a standard value giving unit 51, serving as giving means, for transferring the standard temperature of the CCD 4 to a look-up table unit 52, which will be described later; and the look-up table unit 52, serving as look-up table means, for holding a look-up table which records a relationship of the amount of noises among the zero-order component from the zero-order extracting unit 15, the temperature from the standard value giving unit 51, the gain from the control unit 25, and for outputting, to the noise reducing unit 21, the amount of noises obtained by referring to the look-up table. The standard value giving unit 51 and the look-up table unit 52 are interactively connected to the control unit 25 for control operation.

The operation with the above-mentioned structure is as follows.

The zero-order extracting unit 15 extracts the zero-order component under the control of the control unit 25, and transfers the extracted component to the look-up table unit 52. The control unit 25 obtains the gain of the signal based on the result of estimating the photometry from the photometry estimating unit 7 and the set value of the signal processing unit 10, and transfers the obtained gain to the look-up table unit 52. Further, the standard value giving unit 51 transfers the standard temperature of the image pickup device to the look-up table unit 52.

The look-up table unit 52 holds the look-up table for recording the relationship among the zero-order component, the temperature, the gain, and the amount of noises, and comprises the means similar to that according to the first embodiment. The look-up table unit 52 refers to the look-up table by using the zero-order component from the zero-order extracting unit 15, the temperature from the standard value giving unit 51, and the gain from the control unit 25, obtains the amount of noises, and transfers the obtained amount of noises to the noise reducing unit 21.

According to the second embodiment, as shown in FIG. 9C, four amounts of noises are calculated corresponding to the zero-order component 2×2 pixels (namely, four pixels). The calculated amount of noises is used for the high-frequency component as follows. First, the high-frequency component is the secondary high-frequency component (secondary horizontal component Hh2, secondary vertical component Hv2, or secondary diagonal component Hs2), then, the block comprises the 2×2 pixels, and the amount of noises is used for the pixel corresponding to the position with a one-to-one corresponding relationship. The high-frequency component is the primary high-frequency component (primary horizontal component Hh1, primary vertical component Hv1, or primary diagonal component Hs1), then, the block comprises the 4×4 pixels, the amount of noises of one pixel is enlarged by two times in the vertical and horizontal direction, and it is used for the unit of 2×2 pixels.

Next, a description is given of one example of the structure of the noise reducing unit 21 with reference to FIG. 11.

The noise reducing unit 21 according to the second embodiment comprises: a horizontal line extracting unit 61, serving as frequency separating means, for extracting the horizontal line from the high-frequency component except for the zero-order component extracted by the high-frequency extracting unit 19; a first smoothing unit 62, serving as smoothing means, for smoothing the horizontal line extracted by the horizontal line extracting unit 61; a buffer 63 for temporarily storing the smoothing result of the first smoothing unit 62; a vertical line extracting unit 64, serving as frequency separating means, for reading, in the vertical direction, the data through the smoothing processing in the horizontal direction stored in the buffer 63; a second smoothing unit 65, serving as smoothing means, for smoothing the line in the vertical direction read by the vertical line extracting unit 64 and for outputting the smoothed line to the high-frequency quantizing unit 22; a threshold setting unit 66, serving as threshold setting means, for setting a threshold in the smoothing operation based on the noise value estimated by the noise estimating unit 20 and for outputting the set threshold to the first smoothing unit 62 and the second smoothing unit 65; and a determining unit 67, serving as selecting means, for estimating the threshold n serving as the high-frequency component which does not store the information based on the image quality mode obtained from the control unit and for outputting the estimated threshold n to the first smoothing unit 62 and the second smoothing unit 65.

The horizontal line extracting unit 61, the vertical line extracting unit 64, the threshold setting unit 66, and the determining unit 67 are interactively connected to the control unit 25 for control operation.

The operation of the noise reducing unit 21 with the above-mentioned structure is as follows.

The horizontal line extracting unit 61 individually extracts three high-frequency component horizontal Hhi, vertical Hvi, and diagonal Hsi (i=1 and 2) based on the unit of horizontal line from the high-frequency extracting unit 19 under the control of the control unit 25, and transfers the extracted high-frequency component to the first smoothing unit 62.

The threshold setting unit 66 obtains, from the noise estimating unit 20, the corresponding amount of noises of the high-frequency component based on the unit of horizontal line extracted by the horizontal line extracting unit 61 under the control of the control unit 25, and transfers the obtained amount of noises used as the threshold to the first smoothing unit 62.

The determining unit 67 obtains, from the control unit 25, the information on the image quality mode set by the external I/F unit 26, and obtains the corresponding compressing ratio from the image quality mode. Further, the determining unit 67 estimates the threshold n of the high-frequency component which does not store the information by the obtained compressing ratio, namely, of the high-frequency component which does not store the noise component, and transfers the threshold n to the first smoothing unit 62 and the second smoothing unit 65.

The first smoothing unit 62 reduces the noises of only the frequency component of the n-th order component or less based on the threshold n obtained from the determining unit 67 and outputs the frequency component of the number of orders higher than the n-th order to the buffer 63 without processing. When the frequency component is the n-th order component or less, the first smoothing unit 62 scans the high-frequency component from the horizontal line extracting unit 61 based on the unit of pixel, and performs, e.g., a well-known hysteresis smoothing of the threshold, as the amount of noises, from the threshold setting unit 66. The result of hysteresis smoothing is sequentially outputted and is stored in the buffer 63.

The operation of hysteresis smoothing of the first smoothing unit 62 is synchronized with the operation of the noise estimating unit 20 and the operation of the threshold setting unit 66 under the control of the control unit 25.

The entire high-frequency components outputted from the high-frequency extracting unit 19 is processed by the first smoothing unit 62, the vertical line extracting unit 64 individually extracts the three high-frequency component horizontal Hhi, vertical Hvi, and diagonal Hsi (i=1 and 2) from the buffer 63 based on the unit of vertical line under the control of the control unit 25, and transfers the extracted components to the second smoothing unit 65.

The threshold setting unit 66 obtains, from the noise estimating unit 20, the corresponding amount of noises of the high-frequency component based on the unit of vertical line extracted by the vertical line extracting unit 64 under the control of the control unit 25, and transfers the obtained amount of noises as the threshold to the second smoothing unit 65.

The second smoothing unit 65 does not perform the processing of the high frequency component of the number of order higher than n based on the threshold n obtained from the determining unit 67, and outputs the frequency component to the high-frequency quantizing unit 22. When the frequency component is n-th order component or less, the second smoothing unit 65 scans the high-frequency component from the vertical line extracting unit 64 based on the unit of pixel, and performs, e.g., well-known hysteresis smoothing processing of the high-frequency component by using the threshold from the threshold setting unit 66 as the amount of noises. The result of hysteresis smoothing processing is sequentially outputted to the high-frequency quantizing unit 22.

The operation of hysteresis smoothing of the second smoothing unit 65 is synchronized with the operation of the noise estimating unit 20 and the operation of the threshold setting unit 66 under the control of the control unit 25.

Then, similarly to the first embodiment, the compressing unit 23 compresses the signal, and the output unit 24 records and stores the compressed signal to the memory card or the like. The compression in this time is performed in conformity with well-known JPEG2000.

As mentioned above, the noise reduction uses the hysteresis smoothing. However, the present invention is not limited to this. For example, the noise reduction shown by Formula 5 can be applied similarly to the first embodiment.

According to the second embodiment, the compression using the frequency space and the noise reduction are integrated, thereby structuring the image pickup system for obtaining the high-quality image with low costs.

Further, various parameters including the zero-order component on the amount of noises and the temperature and gain of the image pickup device in the photographing operation are dynamically obtained every photographing operation, and the amount of noises is calculated by using the table based on the parameters. Therefore, the amount of noises is estimated with high precision and high speed.

The amount of noises is determined as the threshold and only the signal having the threshold or less is subjected to the smoothing processing. Therefore, the signal except for the noise component is stored as the original signal and the image with the high quality from which only the noises are reduced is obtained.

Further, when the parameters such as the temperature and the gain necessary for calculating the amount of noises are not obtained, the noises are always reduced by using the standard value. In addition, the calculation of one part of parameters is intentionally omitted, thereby structuring the image pickup system with low costs and low power consumption.

The noises of only necessary frequency band are reduced depending on the compressing ratio, thereby increasing the speed of processing.

Figure 12:
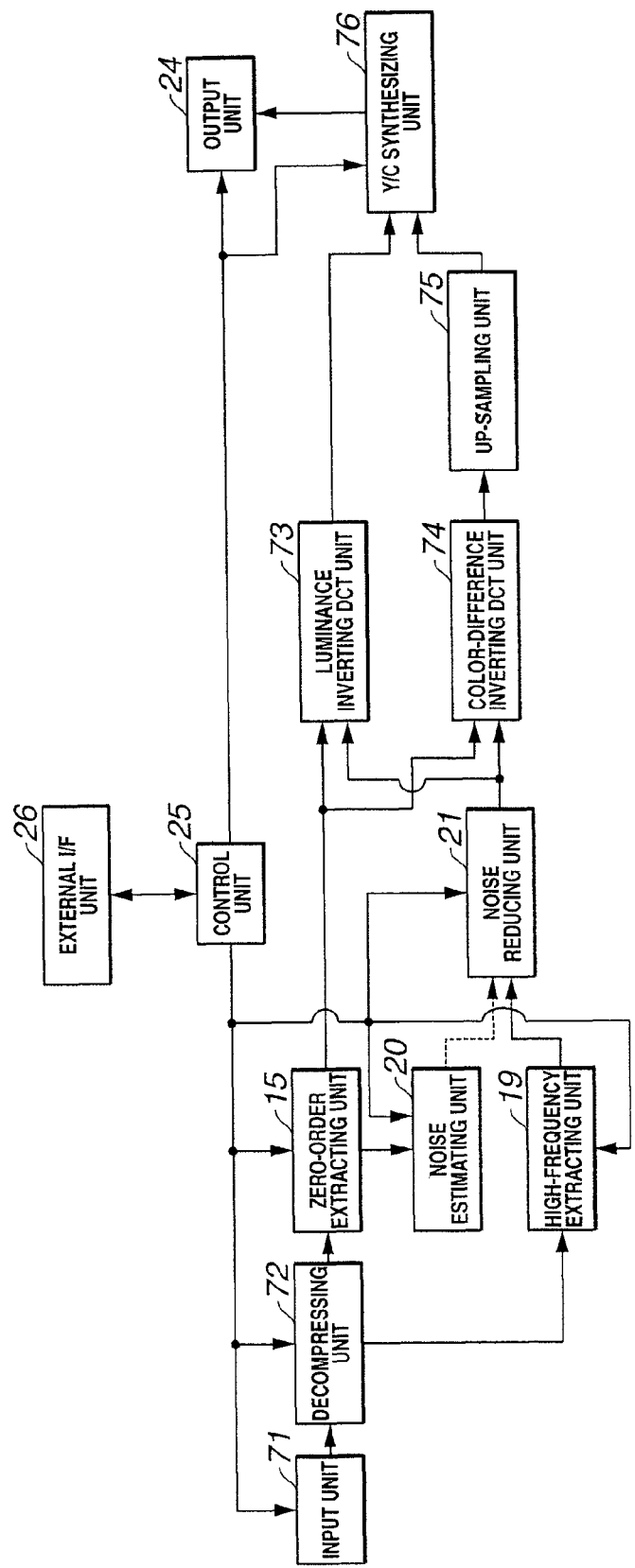
FIG. 12 is a block diagram showing the structure of a replay system according to a third embodiment of the present invention.
Figure 13A:
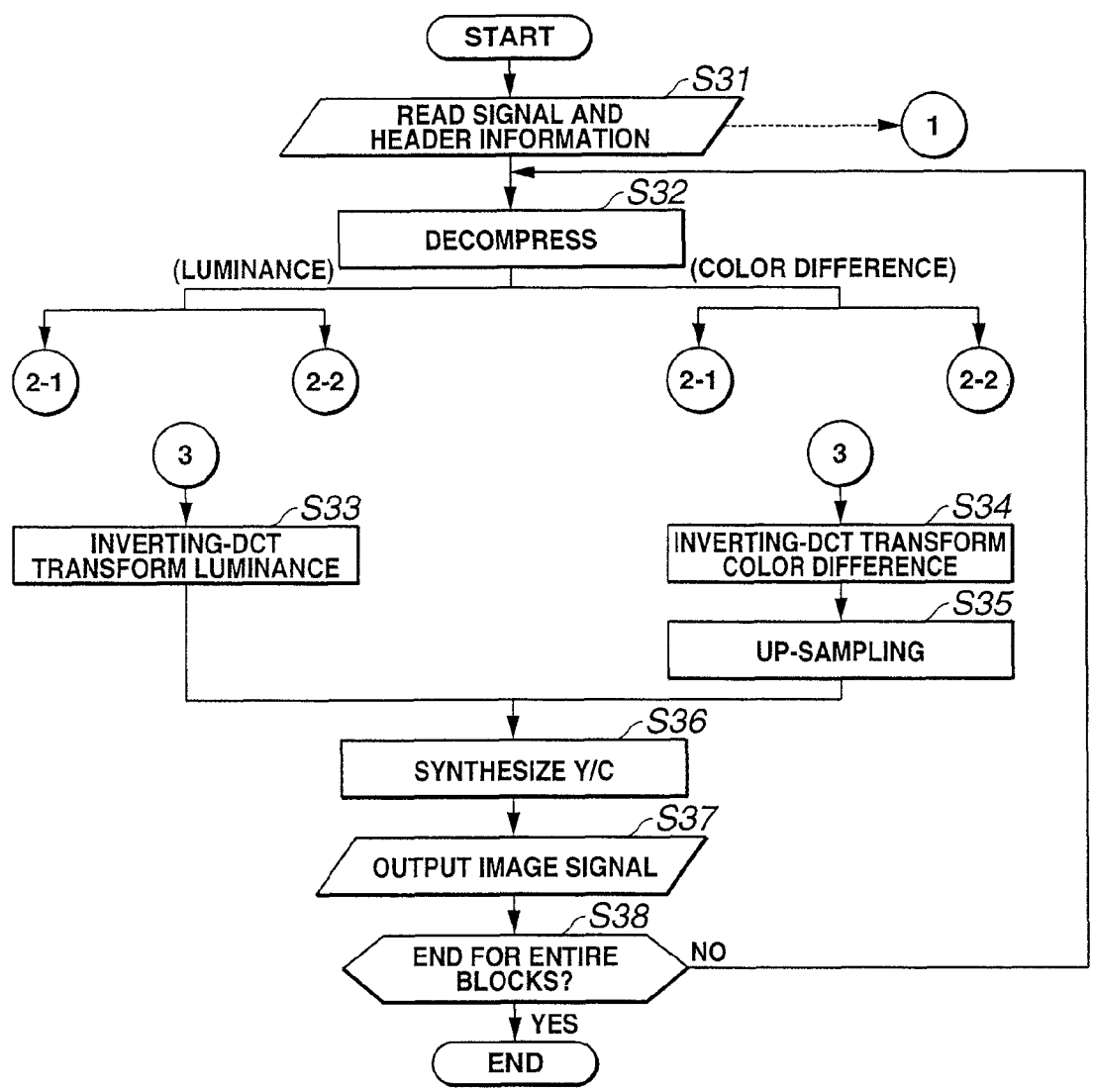
FIG. 13A is a flowchart showing one software processing of decompression and noise reduction according to the third embodiment.
Figure 13B:
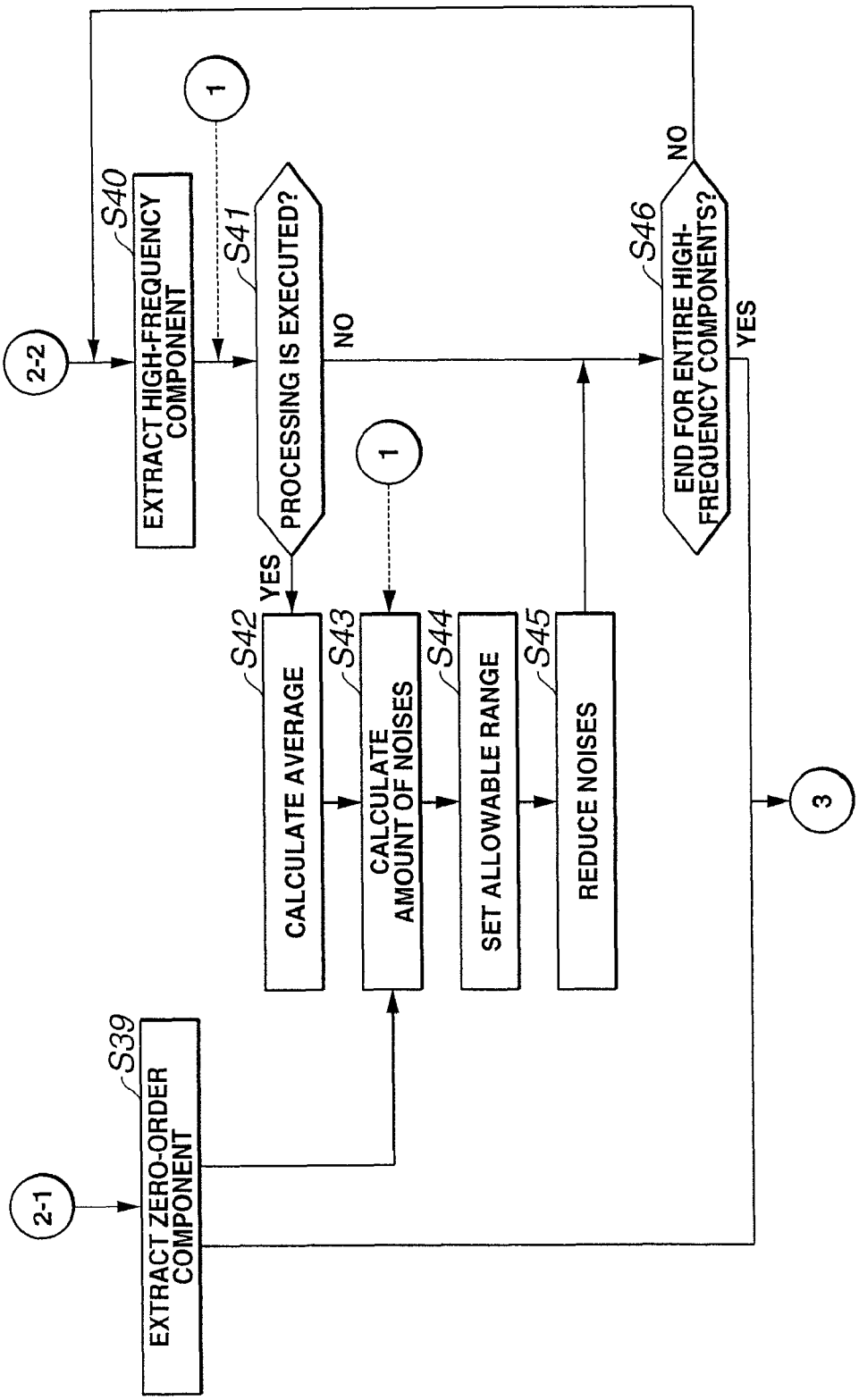
FIG. 13B is a flowchart showing another software processing of decompression and noise reduction according to the third embodiment.

FIGS. 12, 13A, and 13B show the third embodiment of the present invention. FIG. 12 is a block diagram showing the structure of a replay system. FIGS. 13A and 13B are flowcharts showing the software processing of noise reduction and decompression.

The third embodiment relates to the replay system, and the components for noise reduction are the same as those according to the first and second embodiments. Therefore, the same components are designated by the same reference numerals, a description thereof is omitted, and different points are mainly described.

It is assumed for decompression that the R, G, and B signals through the JPEG compression described according to the first embodiment are decompressed. Further, it is assumed that the information in the photographing operation is written to the header portion.

Similarly to FIG. 1, the replay system comprises: the zero-order extracting unit 15; the high-frequency extracting unit 19; the noise estimating unit 20; the noise reducing unit 21; the output unit 24; the control unit 25; and the external I/F unit 26. Further, the replay system comprises: an input unit 71 for reading the compressed signal stored in the recording medium such as the memory card; a decompressing unit 72, serving as decompressing means, for decompressing the compressed signal from the input unit 71 and outputting the decompressed signal to the zero-order extracting unit 15 and the high-frequency extracting unit 19; a luminance inverting DCT unit 73, serving as inverting transforming means, for inverting-DCT-transforming the luminance component of the zero-order component from the zero-order extracting unit 15 and the luminance component of the high-frequency component from which the noises are reduced from the noise reducing unit 21; a color difference inverting DCT unit 74, serving as inverting transforming means, for inverting-DCT transforming the color difference component of the zero-order component from the zero-order extracting unit 15 and the color difference component of the high-frequency component from which the noises are reduced from the noise reducing unit 21; an up-sampling unit 75 for up-sampling the color difference component from the color difference inverting DCT unit 74; and a Y/C synthesizing unit 76 for synthesizing the luminance component of the luminance inverting DCT unit 73 and the color difference component from the up-sampling unit 75 to generate the R, G, and B signals and for outputting the R, G, and B signals to the output unit 24 serving as a display device, e.g., a CRT monitor or a liquid crystal monitor.

The input unit 71, the decompressing unit 72, the zero-order extracting unit 15, the high-frequency extracting unit 19, the noise estimating unit 20, the noise reducing unit 21, the Y/C synthesizing unit 76, the output unit 24, and the external I/F unit 26 are interactively connected to the control unit 25 comprising a microcomputer for control operation.

The external I/F unit 26 according to the third embodiment comprises interfaces of a power switch and a reading button.

Next, a description is given of the signal flow of the replay system shown in FIG. 12.

The reading button is operated via the external I/F unit 26, thereby reading, from the input unit 71, the compressed signal stored in the reading medium such as a memory card.

The compressed signal is transferred to the decompressing unit 72, is subjected to the decompression based on the Huffman coding or arithmetic coding, and is transformed into the signal in the frequency space.

The zero-order extracting unit 15 extracts the zero-order component from the signal in the frequency space, and transfers the extracted signal to the noise estimating unit 20.

The noise estimating unit 20 receives, from the control unit 25, the information in the photographing operation recorded as the header information of the image, calculates the amount of noises of the frequency component except for the zero-order component similarly to the first embodiment, and transfers the calculated amount of noises to the noise reducing unit 21.

The high-frequency extracting unit 19 extracts the frequency component except for the zero-order component from the signal in the frequency space decompressed by the decompressing unit 72, and transfers the extracted component to the noise reducing unit 21.

Similarly to the first embodiment, the noise reducing unit 21 reduces the noises of the frequency component except for the zero-order component from the high-frequency extracting unit 19 based on the amount of noises from the noise estimating unit 20.

The zero-order component extracted by the zero-order extracting unit 15 and the high-frequency component through the noise reduction by the noise reducing unit 21 are transferred to the luminance inverting DCT unit 73 or the color difference inverting DCT unit 74, and are transferred into the signal in the real space. In this case, the luminance signal and the color difference signal are switched under the control of the control unit 25, and are processed based on the unit of block obtained from the decompressing unit 72.

The luminance signal from the luminance inverting DCT unit 73 is transferred to the Y/C synthesizing unit 76. The color difference signal from the color difference inverting DCT unit 74 is up-sampled by a predetermined ratio by the up-sampling unit 75, and then is transferred to the Y/C synthesizing unit 76.

The Y/C synthesizing unit 76 synthesizes the luminance signal based on the unit of block and the color difference signal based on the unit of block on the basis of the following Formula 6 under the control of the control unit 25 when the luminance signal and the color difference signal are collected, and generates the R, G, and B signals.

$$R = Y + 1.40200 Cr$$

$$G = Y - 0.34414 Cb - 0.71414 Cr$$

$$B = Y + 1.77200 Cb - 0.41869 Cr \qquad \text{[Formula 6]}$$

The R, G, and B signals generated by the Y/C synthesizing unit 76 are sequentially transferred to the buffer in the output unit 24.

The reading processing is executed in the hardware and, however, the present invention is not limited to this. For example, the compressed signal stored in the recording medium such as a memory card and the header information such as the temperature and the gain in the photographing operation may be read in a computer and may be processed independently on software.

Next, a description is given of the software processing for decompression and noise reduction with reference to FIGS. 13A and 13B. FIG. 13A shows the main flow of the software processing. FIG. 13B shows the common processing between the luminance signal and the color difference signal.

Referring to FIG. 13A, starting the processing, first, the compressed signal and the header information such as the temperature and the gain are read (in step S31). The read header information is transferred to the processing in steps S41 and S43, which will be described later.

Next, the decompression based on the Huffman coding or arithmetic coding is performed based on the unit of block, and the luminance signal Y and the color difference signals Cb and Cr in the frequency space are generated (in step S32). The generated luminance signal Y is used for the processing in steps S39 and S40, which will be described later. After the processing until step S46, which will be described later, the processing shifts to step S33. Similarly, the generated color difference signals Cb and Cr are used for the processing in steps S39 and S40, which will be described later. After processing until step S46, which will be described later, the processing shifts to step S34.

That is, the luminance signal Y is inverting DCT transformed (in step S33). The color difference signals Cb and Cr are inverting DCT transformed (in step S34). Further, the color difference signals Cb and Cr are up-sampled by a predetermined ratio (in step S35).

The luminance signal Y transformed in step S33 and the color difference signals Cb and Cr up-sampled in step S34 are synthesized to generate the R, G, and B signals (in step S36). The synthesized R, G, and B signals are outputted (in step S37).

Then, it is determined whether or not the processing ends for the entire blocks (in step S38). If the processing does not end, the processing returns to step S32 whereupon the processing is executed as mentioned above for the next block. If the processing ends, a series of processing ends.

Next, a description is given of the noise reduction in steps S39 to S46 with reference to FIG. 13B. As mentioned above, the processing is commonly performed to the luminance signal Y and the color difference signals Cb and Cr.

The zero-order component of the luminance signal Y or color difference signals Cb and Cr is extracted (in step S39). The high-frequency component except for the zero-order component of the luminance signal Y or color difference signals Cb and Cr is extracted (in step S40).

It is determined whether or not the noises are reduced based on the header information read in step S31 (in step S41).

In the noise reduction, an average of the high-frequency component is calculated (in step S42).

The amount of noises is calculated based on Formula 2 by using the zero-order component extracted in step S39 and the header information read in step S31 (in step S43).

The allowable range is set based on Formula 4 (in step S44). The noises are reduced based on Formula 5 (in step S45).

When step S45 ends or the noises are not reduced in step S41, it is determined whether or not the processing ends for the entire high-frequency components (in step S46). If the processing does not end, the processing returns to step S40 whereupon the above-mentioned processing is executed for another high-frequency component. If the processing ends, the processing shifts to step S33 or S34.

The independent replay system is described as mentioned above. However, the present invention is not limited to this. For example, the replay system may be combined to the image pickup system according to the first or second embodiment to structure an image pickup replay system. In this case, the continuous photographing operation is fast by omitting the noise reduction in the photographing operation. The noises are additionally reduced after the photographing operation, thereby obtaining the high-quality image.

According to the third embodiment, the decompression using the frequency space and the noise reduction are integrated, thereby structuring the replay system for obtaining the high-quality image with low costs.

Not only the zero-order component for calculating the amount of noises is obtained every image but also various parameters such as the temperature and the gain of the image pickup device in the photographing operation on the amount of noises are obtained as the header information for each image. Further, the amount of noises is calculated based on the obtained information, thereby estimating the amount of noises with high precision.

Only the signal having the estimated amount of noises or less is subjected to the smoothing processing, thereby effectively reducing the noises.

Further, when the parameters the temperature and the gain for calculating the amount of noises are not obtained, the standard value is used, thereby always reducing the noises.

Figure 14:
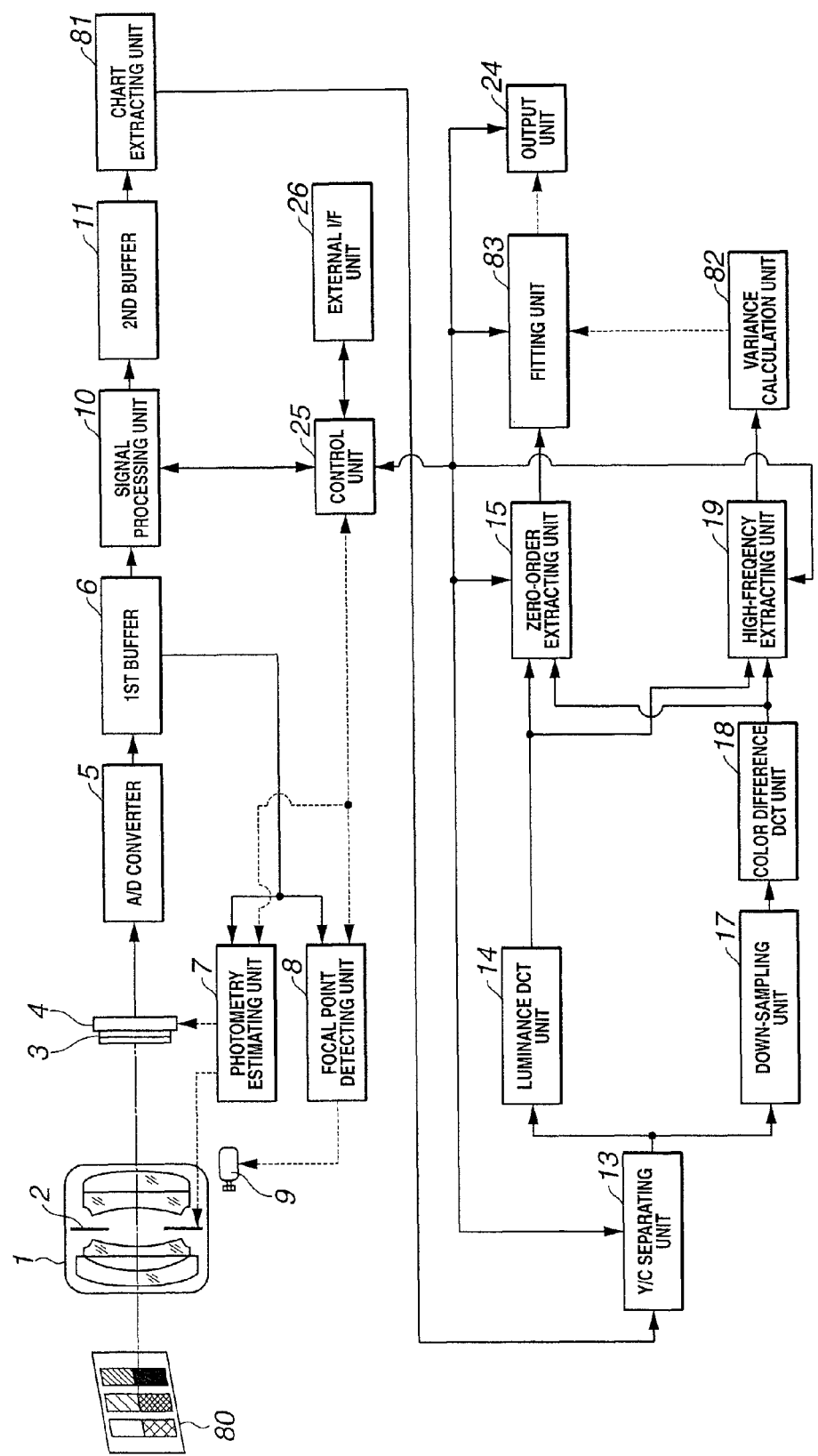
FIG. 14 is a block diagram showing the structure of an image pickup system according to a fourth embodiment of the present invention.
Figure 15:
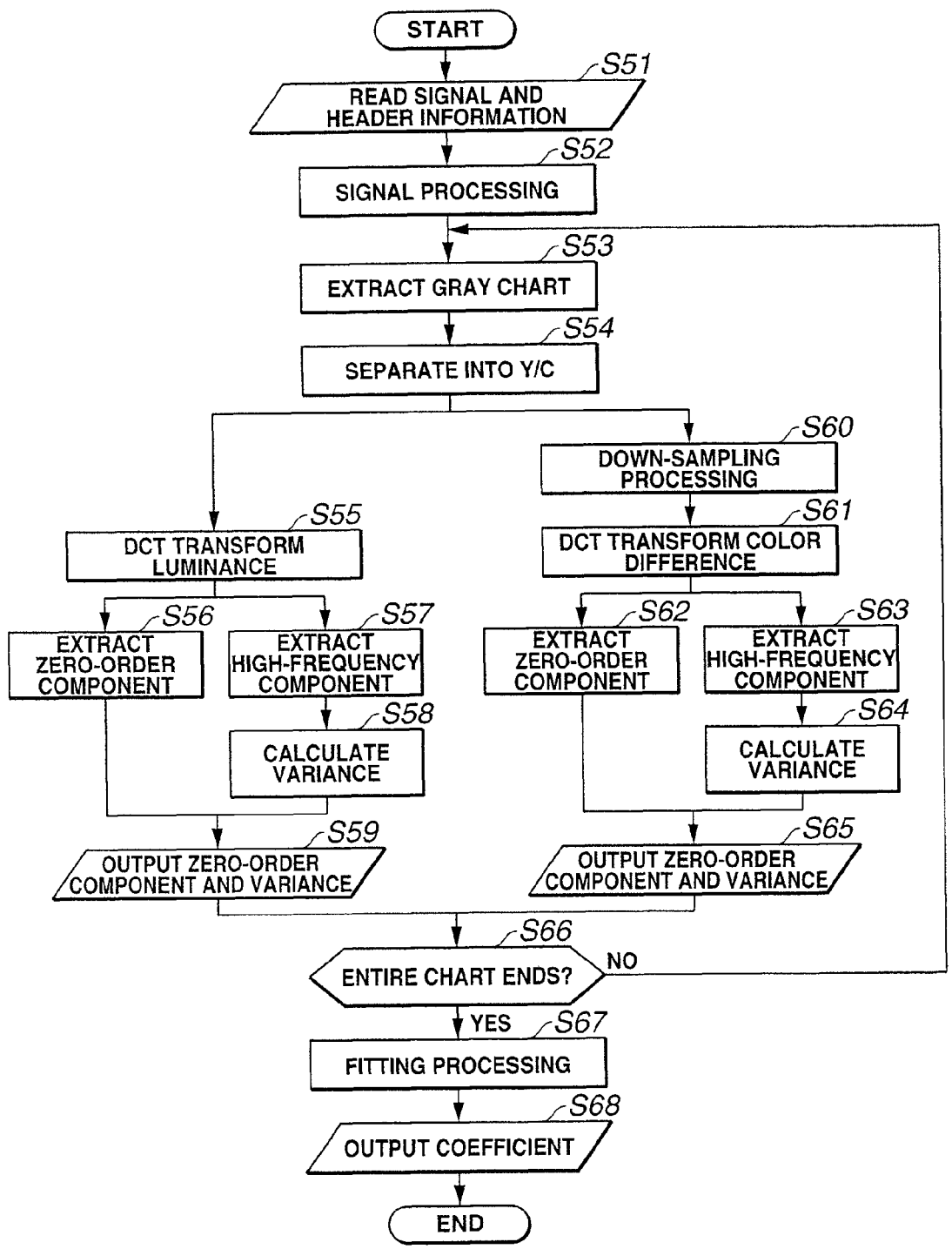
FIG. 15 is a flowchart showing software processing of parameter correction for noise reduction according to the fourth embodiment.

FIGS. 14 and 15 show the fourth embodiment of the present invention. FIG. 14 is a block diagram showing the structure of an image pickup system. FIG. 15 is a flowchart showing the software processing for correcting the parameters for the noise reduction.

According to the fourth embodiment, the same portions as those according to the first to third embodiments are designated by the same reference numerals, a description thereof is omitted, and only different portions are described.

The image pickup system according to the fourth embodiment corrects the parameters for the noise reduction.

That is, referring to FIG. 14, the image pickup system according to the fourth embodiment is structured by deleting, from the structure according to the first embodiment, the block extracting unit 12, the zero-order quantizing unit 16, the noise estimating unit 20, the noise reducing unit 21, the high-frequency quantizing unit 22, and the compressing unit 23. Further, the image pickup system according to the fourth embodiment comprises: a correcting image 80 having three types or more of gray charts with different reflectances ranging white to black; a chart extracting unit 81, serving as chart separating means and block extracting means, for extracting the chart from the video signal stored in the second buffer 11 and for outputting the extracted gray chart to the Y/C separating unit 13; a variance calculating unit 82, serving as variance calculating means, for calculating the variance of the high-frequency component extracted from the high-frequency extracting unit 19; and a fitting unit 83, serving as fitting means, for fitting the output of the zero-order extracting unit 15 by using the variance calculated by the variance calculating unit 82 and for transferring the fitted outputted to the output unit 24.

The fitting unit 83 in the additional structure is interactively connected to the control unit 25 for control operation.

Next, a description is given of the signal flow in the image pickup system shown in FIG. 14.

After setting, via the external I/F unit 26, the ISO sensitivity and the photographing condition such as an image quality mode, the correcting image 80 is picked-up. In the photographing operation the photographing distance is adjusted so as to view the correcting image 80 on the entire screen and to uniformly irradiate illumination light on the entire correcting image 80. The video signal obtained by photographing the correcting image 80 is processed similarly to the first embodiment and is stored in the second buffer 11.

Next, the chart extracting unit 81 separates the gray charts in the image signal on the entire screen, extracts the block area with a predetermined size, one-size smaller than the gray chart, as the gray chart corresponding portion, and sequentially transfers the extracted gray charts to the Y/C separating unit 13. The portion corresponding to the gray chart is automatically separated when the correcting image 80 is adjusted to be viewed on the entire screen and when the arrangement of gray charts is well known.

The Y/C separating unit 13 transforms the R, G, and B signals into the luminance signal Y and the color difference signals Cb and Cr based on Formula 1. Then, the luminance signal Y is transferred to the luminance DCT unit 14, and the color difference signals Cb and Cr are transferred to the color difference DCT unit 18 via the down-sampling unit 17.

As mentioned above, the luminance DCT unit 14 and the color difference DCT unit 18 transform the signals in the real space into the signals in the frequency space by the well-known DCT (Discrete Cosine Transform) transformation.

The zero-order extracting unit 15 sequentially extracts zero-order component of the luminance signal Y and the color difference signals Cb and Cr of the signals transformed in the frequency space under the control of the control unit 25, and the high-frequency extracting unit 19 extracts the high-frequency component. The zero-order component extracted by the zero-order extracting unit 15 is transferred to the fitting unit 83. The high-frequency component extracted by the high-frequency extracting unit 19 is transferred to the variance calculating unit 82.

The variance calculating unit 82 calculates a variance value of the high-frequency component as a value corresponding to the amount of noises, and transfers the calculated variance value to the fitting unit 83. The above-mentioned processing is executed for the entire gray charts.

The fitting unit 83 formulates the amount of noises under the control of the control unit 25, upon collecting, for the entire gray charts, the information on the zero-order component L extracted by the zero-order extracting unit 15 and variance value N calculated by the variance calculating unit 82. Here, as a formulation of the amount of noises, a formulation of [$N = AL^B + C$ (where reference symbols A, B, and C denote the constant terms)]. The formulation is performed by plotting the zero-order component L of the gray charts and the variance value N to obtain the constant terms A, B, and C with the well-known least squares method. The constant terms are individually calculated for the three data types of the luminance signal Y, the color difference signal Cb, and the color difference signal Cr.

The above-calculated constant terms A, B, and C are transferred, recorded, and stored to the output unit 24 serving as coefficient storing means. This processing is executed for the entire combinations of the image quality mode and the ISO sensitivity set via the external I/F unit 26, thereby correcting the parameter for noise reduction.

The correction is performed on the hardware. However, the present invention is not limited to this. For example, the video signal from the CCD 4 may be outputted as the Raw data without processing. Further, the information on the temperature and the gain in the photographing operation from the control unit 25 is outputted as the header information and may be processed independently on software.

Next, a description is given of the software for correcting the parameter for noise reduction with reference to FIG. 15.

This processing starts, first, the video signal of the correcting image 80 obtained as the Raw data and the header information such as the temperature and the gain are read to the computer (in step S51).

General signal processing such as white balance, interpolation, and emphasis is executed (in step S52). Then, the corresponding portions of the gray charts are individually extracted (in step S53).

The video signal of the pixel in the gray chart is transformed into the luminance signal Y and the color signals Cb and Cr (in step S54).

The luminance signal Y among the transformed signals is transformed into a signal in the frequency space by the DCT transformation (in step S55). The zero-order component is extracted (in step S56). The high-frequency component except for the zero-order is extracted (in step S57). The variance value of the high-frequency component among the components is calculated (in step S58).

Then, the zero-order component extracted in step S56 and the variance value calculated in step S58 are outputted (in step S59).

The color difference signals Cb and Cr separated in step S54 are down-sampled by a predetermined ratio (in step S60). The color difference signals Cb and Cr are DCT-transformed and are transformed into a the signal in the frequency space (in step S61).

The zero-order component is extracted (in step S62). The high-frequency component except for the zero-order component is extracted (in step S63). The variance value of the high-frequency component among the extracted components is calculated (in step S64).

Next, the zero-order component extracted in step S62 and the variance value calculated in step S64 are outputted (in step S65).

Then, it is determined whether or not the processing ends for the entire corresponding portions of the gray charts (in step S66). If the processing does not end, the processing returns to step S53 whereupon the above-mentioned processing is executed for another corresponding portion of the gray chart.

If the processing ends for the entire corresponding portions of the gray charts, the fitting based on the least squares method is performed and the parameters for noise reduction of the luminance signal Y and the color difference signals Cb and Cr are calculated (in step S67).

The parameters for noise reduction calculated in step S67 are outputted (in step S68), and a series of processing ends.

The formulation of the amount of noises uses the function of the power indicated in Formula 2. However, the present invention is not limited to the above function. For example, the formulation may use a quadratic expression of [$N=AL^2+BL+C$]. Alternatively, the formulation may use another polynomial expression or sprine function.

According to the fourth embodiment, the parameter for noise reduction is easily calculated by photographing the correcting image comprising the standard gray scale. Therefore, the amount of noises can be estimated with high precision and flexibility even for a system without calculation of parameter, the aging change in system, and the change in system structure. For example, the structure according to the fourth embodiment is combined to that according to the third embodiment, thereby reducing the noises with high precision for the system without calculation of parameter for noise reduction.

The parameter of the function for estimating the amount of noises is independently stored and therefore the noises are reduced out of the image pickup system.

The present invention is not limited to the above embodiments, and can variously be modified or be applied without departing the range of the essentials of the present invention.

According to the present invention, as mentioned above, the image with the high quality is fast captured with low costs.

Further, according to the present invention, the image with high quality is captured flexibly corresponding to various systems.

What is claimed is:

1. An image pickup system comprising:
a block extracting unit for extracting a block area with a predetermined size from a signal of an image pickup device;
a transforming unit for transforming the signal in the block area extracted by the block extracting unit into a signal in a frequency space;
a noise estimator for estimating an amount of noise of a frequency component except for a zero-order component based on a zero-order component in the signal in the frequency space transformed by the transforming unit;
a noise reducing unit for reducing noise of the frequency component except for the zero-order component based on the amount of noise estimated by the noise estimator;
a compressing unit for compressing the zero-order component and the frequency component except for the zero-order component from which the noise is reduced,
wherein the block extracting unit comprises a chart separating unit for separating a part corresponding to a gray chart from the signal obtained by picking-up an image for correction including at least three types of gray charts with different reflectances by the image pickup device, and
the transforming unit transforms the part corresponding to the gray chart separated by the chart separating unit into the signal in the frequency space, and
the image pickup system further comprises:
a variance calculating unit for calculating a variance N of the frequency component except for the zero-order component of the corresponding part of the gray chart; and
a fitting unit for calculating coefficients A, B, and C based on one of functional formulae $N=AL^B+C$ and $N=AL^2+BL+C$ where L is the zero-order component and N is the variance.

2. An image pickup system comprising:
a block extracting unit for extracting a block area with a predetermined size from a signal of an image pickup device;
a transforming unit for transforming the signal in the block area extracted by the block extracting unit into a signal in a frequency space;
a noise estimator for estimating an amount of noise of a frequency component except for a zero-order component based on a zero-order component in the signal in the frequency space transformed by the transforming unit;
a noise reducing unit for reducing noise of the frequency component except for the zero-order component based on the amount of noise estimated by the noise estimator; and
a compressing unit for compressing the zero-order component and the frequency component except for the zero-order component from which the noise is reduced,
wherein the block extracting unit comprises a chart separating unit for separating a part corresponding to a gray chart from the signal obtained by picking-up an image for correction including at least three types of gray charts with different reflectances by the image pickup device, and
the transforming unit transforms the part corresponding to the gray chart separated by the chart separating unit into the signal in the frequency space, and
the image pickup system further comprises:
a variance calculating unit for calculating a variance N of the frequency component except for the zero-order component of the corresponding part of the gray chart; and
a fitting unit for calculating coefficients A, B, and C based on one of functional formulae $N=AL^B+C$ and $N=AL^2+BL+C$ using a value L of where L is the zero-order component and N is the variance; and
further comprising:
a coefficient storing unit for storing the coefficients A, B, and C calculated by the fitting unit.

3. A method for reducing noise in an image produced by an image pickup system having an image pickup device configured to convert an optical image into a signal, comprising the steps of:
a) extracting a block area of a predetermined size from a signal provided by an image pickup device;
b) transforming the signal in the block area extracted in step (a) into a signal in a frequency space;
c) estimating an amount of noise in a frequency component except for a zero-order component based on the zero-order component in the signal in the frequency space transformed at step (b);
d) reducing noise in the frequency component except for the zero-order component based on the amount of noise estimated at step (c); and
e) compressing the zero-order component and the frequency component except for the zero-order component from which the noise is reduced, and wherein step (d) further comprises:

f) calculating an average of the frequency component except for the zero-order component;

g) setting an upper limit value and a lower limit value of the frequency component except for the zero-order component based on the average calculated at step (f) and the amount of noise estimated at step (c); and h) correcting the frequency component except for the zero-order component based on the upper limit value and the lower limit value set at step (g), and wherein step (a) further comprises:

i) separating a part corresponding to a gray chart from the signal obtained by picking-up an image for correction including at least three types of gray charts with different reflectances by an image pickup device, and wherein step (b) transforms the part corresponding to the gray chart separated at step (i) into the signal in the frequency space, and the method further comprises the steps of:

j) calculating a variance N of the frequency component except for the zero-order component of the corresponding part of the gray chart; and k) calculating coefficients A, B, and C based on one of functional formulae of $N=AL^B+C$ and $N=AL^2+BL+C$ by using a value L of where L is the zero-order component and N is the variance.

* * * * *

UNITED STATES PATENT AND TRADEMARK OFFICE
CERTIFICATE OF CORRECTION

PATENT NO. : 7,847,841 B2
APPLICATION NO. : 12/276760
DATED : December 7, 2010
INVENTOR(S) : Takao Tsuruoka It is certified that error appears in the above-identified patent and that said Letters Patent is hereby corrected as shown below:

In claim 2, at column 22, line 45, delete the phrase "using a value L of".

In claim 3, column 24, line 12, delete the phrase "by using a value L of".

Signed and Sealed this
Tenth Day of January, 2012

David J. Kappos
*Director of the United States Patent and Trademark Office*